(12) United States Patent  (10) Patent No.: US 8,350,451 B2
Bright et al.  (45) Date of Patent: Jan. 8, 2013

(54) ULTRATHIN TRANSPARENT EMI SHIELDING FILM COMPRISING A POLYMER BASECOAT AND CROSSLINKED POLYMER TRANSPARENT DIELECTRIC LAYER

(75) Inventors: Clark I. Bright, Tucson, AZ (US); John D. Le, Cottage Grove, MN (US); Robert C. Fitzer, North Oaks, MN (US); Stephen P. Maki, North St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 468 days.

(21) Appl. No.: 12/133,483

(22) Filed: Jun. 5, 2008

(65) Prior Publication Data

US 2009/0303602 A1 Dec. 10, 2009

(51) Int. Cl.
*H01J 5/16* (2006.01)
*G02B 1/10* (2006.01)

(52) U.S. Cl. ........................................ 313/110; 359/585

(58) Field of Classification Search .................. None
See application file for complete search history.

(56) References Cited

U.S. PATENT DOCUMENTS

| | | | |
|---|---|---|---|
| 2,676,117 A | 4/1954 | Colbert et al. |
| 3,302,002 A | 1/1967 | Warren |
| 3,311,517 A | 3/1967 | Keslar et al. |
| 3,475,307 A | 10/1969 | Knox et al. |
| 3,601,471 A | 8/1971 | Seddon et al. |
| 3,607,365 A | 9/1971 | Lindlof |
| 3,682,528 A | 8/1972 | Apfel et al. |
| 3,720,541 A | 3/1973 | King |
| 3,752,348 A | 8/1973 | Dickason et al. |
| 3,825,917 A | 7/1974 | Lucky |
| 3,897,140 A | 7/1975 | Tuthill |
| 3,990,784 A | 11/1976 | Gelber |
| 4,017,661 A | 4/1977 | Gillery |
| 4,098,965 A | 7/1978 | Kinsman |
| 4,166,876 A | 9/1979 | Chiba et al. |
| 4,226,910 A | 10/1980 | Dahlen et al. |
| 4,234,654 A | 11/1980 | Yatabe et al. |
| 4,283,482 A | 8/1981 | Hattori et al. |

(Continued)

FOREIGN PATENT DOCUMENTS

BE 704 297 10/1967

(Continued)

OTHER PUBLICATIONS

*Journal*: D. R. Sahu et al., High Quality Transparent Conductive ZnO/Ag/ZnO Multilayer Films Deposited at Room Temperature, Thin Solid Films 515, (2006), pp. 876-879.

(Continued)

*Primary Examiner* — Anh Mai
*Assistant Examiner* — Britt D Hanley
(74) *Attorney, Agent, or Firm* — Stephen F. Wolf; James A. Baker

(57) ABSTRACT

Provided are multi-component films useful as optical display filters. The films include a transparent substrate, a nucleation layer, an electrically-conductive layer, a barrier layer, and a dielectric layer. The films can provide high visible transmission, are corrosion-resistant, and can provide shielding from electromagnetic interference (EMI shielding). The optical display filters are useful as components of active optical devices such as display panels including liquid crystal display panels such as those used on mobile hand-held phones.

17 Claims, 4 Drawing Sheets

U.S. PATENT DOCUMENTS

| | | | |
|---|---|---|---|
| 4,320,169 A | 3/1982 | Yatabe et al. | |
| 4,337,990 A | 7/1982 | Fan et al. | |
| 4,413,877 A | 11/1983 | Suzuki et al. | |
| 4,463,047 A | 7/1984 | Matteucci et al. | |
| 4,537,814 A | 8/1985 | Itoh et al. | |
| 4,556,277 A | 12/1985 | Fan et al. | |
| 4,565,719 A | 1/1986 | Phillips et al. | |
| 4,581,337 A | 4/1986 | Frey et al. | |
| 4,590,118 A * | 5/1986 | Yatabe et al. | 428/215 |
| 4,600,627 A | 7/1986 | Honda et al. | |
| 4,624,867 A | 11/1986 | Iijima et al. | |
| 4,639,069 A | 1/1987 | Yatabe et al. | |
| 4,654,067 A | 3/1987 | Ramus et al. | |
| 4,695,618 A | 9/1987 | Mowrer | |
| 4,696,719 A | 9/1987 | Bischoff | |
| 4,699,830 A | 10/1987 | White | |
| 4,710,426 A | 12/1987 | Stephens | |
| 4,721,349 A | 1/1988 | Fan et al. | |
| 4,722,515 A | 2/1988 | Ham | |
| 4,786,767 A | 11/1988 | Kuhlman | |
| 4,799,745 A | 1/1989 | Meyer et al. | |
| 4,806,220 A | 2/1989 | Finley | |
| 4,828,346 A | 5/1989 | Jacobsen et al. | |
| 4,842,893 A | 6/1989 | Yializis et al. | |
| 4,873,139 A | 10/1989 | Kinosky | |
| 4,910,090 A | 3/1990 | Kuhlman et al. | |
| 4,954,371 A | 9/1990 | Yializis | |
| 4,959,257 A | 9/1990 | Mukherjee | |
| 4,965,408 A | 10/1990 | Chapman et al. | |
| 4,973,511 A | 11/1990 | Farmer et al. | |
| 4,977,013 A | 12/1990 | Ritchie et al. | |
| 5,011,585 A | 4/1991 | Brochot et al. | |
| 5,013,416 A | 5/1991 | Murayama et al. | |
| 5,018,048 A | 5/1991 | Shaw et al. | |
| 5,028,759 A | 7/1991 | Finley | |
| 5,032,461 A | 7/1991 | Shaw et al. | |
| 5,059,295 A | 10/1991 | Finley | |
| 5,062,939 A | 11/1991 | Roland et al. | |
| 5,071,206 A | 12/1991 | Hood et al. | |
| 5,085,141 A | 2/1992 | Triffaux | |
| 5,091,244 A | 2/1992 | Biornard | |
| 5,097,800 A | 3/1992 | Shaw et al. | |
| 5,111,329 A | 5/1992 | Gajewski et al. | |
| 5,125,138 A | 6/1992 | Shaw et al. | |
| 5,237,439 A | 8/1993 | Misono et al. | |
| 5,260,095 A | 11/1993 | Affinito | |
| 5,270,517 A | 12/1993 | Finley | |
| 5,306,547 A | 4/1994 | Hood et al. | |
| 5,354,497 A | 10/1994 | Fukuchi et al. | |
| 5,356,947 A | 10/1994 | Ali et al. | |
| 5,360,659 A | 11/1994 | Arends et al. | |
| 5,377,045 A | 12/1994 | Wolfe et al. | |
| 5,395,644 A | 3/1995 | Affinito | |
| 5,427,638 A | 6/1995 | Goetz et al. | |
| 5,427,861 A | 6/1995 | D'Errico | |
| 5,440,446 A | 8/1995 | Shaw et al. | |
| 5,457,356 A | 10/1995 | Parodos | |
| 5,489,489 A | 2/1996 | Swirbel et al. | |
| 5,506,037 A | 4/1996 | Termath | |
| 5,510,173 A | 4/1996 | Pass et al. | |
| 5,521,765 A * | 5/1996 | Wolfe | 359/885 |
| 5,529,849 A | 6/1996 | D'Errico | |
| 5,536,323 A | 7/1996 | Kirlin et al. | |
| 5,540,446 A | 7/1996 | Felsen | |
| 5,547,508 A | 8/1996 | Affinito | |
| 5,547,908 A | 8/1996 | Furuzawa et al. | |
| 5,554,220 A | 9/1996 | Forrest et al. | |
| 5,576,101 A | 11/1996 | Saitoh et al. | |
| 5,607,789 A | 3/1997 | Treger et al. | |
| 5,620,524 A | 4/1997 | Fan et al. | |
| 5,629,389 A | 5/1997 | Roitman et al. | |
| 5,654,084 A | 8/1997 | Egert | |
| 5,681,615 A | 10/1997 | Affinito et al. | |
| 5,681,666 A | 10/1997 | Treger et al. | |
| 5,684,084 A | 11/1997 | Lewin et al. | |
| 5,686,360 A | 11/1997 | Harvey, III et al. | |
| 5,693,956 A | 12/1997 | Shi et al. | |
| 5,699,188 A | 12/1997 | Gilbert et al. | |
| 5,711,816 A | 1/1998 | Kirlin et al. | |
| 5,725,909 A | 3/1998 | Shaw et al. | |
| 5,731,661 A | 3/1998 | So et al. | |
| 5,739,180 A | 4/1998 | Taylor-Smith | |
| 5,744,227 A | 4/1998 | Bright et al. | |
| 5,747,182 A | 5/1998 | Friend et al. | |
| 5,756,192 A | 5/1998 | Crawley et al. | |
| 5,757,126 A | 5/1998 | Harvey, III et al. | |
| 5,759,329 A | 6/1998 | Krause et al. | |
| 5,771,562 A | 6/1998 | Harvey, III et al. | |
| 5,783,049 A | 7/1998 | Bright et al. | |
| 5,792,550 A | 8/1998 | Phillips et al. | |
| 5,811,177 A | 9/1998 | Shi et al. | |
| 5,811,183 A | 9/1998 | Shaw et al. | |
| 5,821,692 A | 10/1998 | Rogers et al. | |
| 5,844,363 A | 12/1998 | Gu et al. | |
| 5,869,761 A | 2/1999 | Nakamura | |
| 5,872,355 A | 2/1999 | Hueschen | |
| 5,877,895 A | 3/1999 | Shaw et al. | |
| 5,891,554 A | 4/1999 | Hosokawa et al. | |
| 5,902,641 A | 5/1999 | Affinito et al. | |
| 5,902,688 A | 5/1999 | Antoniadis et al. | |
| 5,904,958 A | 5/1999 | Dick et al. | |
| 5,912,069 A | 6/1999 | Yializis et al. | |
| 5,922,161 A | 7/1999 | Wu et al. | |
| 5,945,174 A | 8/1999 | Shaw et al. | |
| 5,948,552 A | 9/1999 | Antoniadis et al. | |
| 5,965,907 A | 10/1999 | Huang et al. | |
| 5,981,059 A | 11/1999 | Bright et al. | |
| 5,996,498 A | 12/1999 | Lewis | |
| 6,007,901 A | 12/1999 | Maschwitz et al. | |
| 6,030,671 A | 2/2000 | Yang et al. | |
| 6,034,813 A | 3/2000 | Woodard et al. | |
| 6,040,017 A | 3/2000 | Mikhael et al. | |
| 6,040,056 A | 3/2000 | Anzaki et al. | |
| 6,040,939 A | 3/2000 | Demiryont et al. | |
| 6,045,864 A | 4/2000 | Lyons et al. | |
| 6,049,419 A | 4/2000 | Wheatley et al. | |
| 6,066,826 A | 5/2000 | Yializis | |
| 6,083,628 A | 7/2000 | Yializis | |
| 6,092,269 A | 7/2000 | Yializis et al. | |
| 6,104,530 A | 8/2000 | Okamura et al. | |
| 6,106,627 A | 8/2000 | Yializis | |
| 6,107,357 A * | 8/2000 | Hawker et al. | 521/77 |
| 6,111,698 A | 8/2000 | Woodard et al. | |
| 6,118,218 A | 9/2000 | Yializis et al. | |
| 6,146,225 A | 11/2000 | Sheats et al. | |
| 6,146,462 A | 11/2000 | Yializis et al. | |
| 6,198,220 B1 | 3/2001 | Jones et al. | |
| 6,204,408 B1 | 3/2001 | Bassler et al. | |
| 6,214,422 B1 | 4/2001 | Yializis | |
| 6,231,939 B1 | 5/2001 | Shaw et al. | |
| 6,243,201 B1 | 6/2001 | Fleming et al. | |
| 6,252,703 B1 | 6/2001 | Nakamura et al. | |
| 6,255,003 B1 | 7/2001 | Woodard et al. | |
| 6,268,695 B1 | 7/2001 | Affinito | |
| 6,316,343 B1 | 11/2001 | Wada et al. | |
| 6,352,777 B1 | 3/2002 | Bulovic et al. | |
| 6,357,880 B2 | 3/2002 | Epstein et al. | |
| 6,376,065 B1 | 4/2002 | Korba et al. | |
| 6,399,228 B1 | 6/2002 | Simpson | |
| 6,413,645 B1 | 7/2002 | Graff et al. | |
| 6,416,872 B1 | 7/2002 | Maschwitz | |
| 6,440,642 B1 * | 8/2002 | Shelnut et al. | 430/315 |
| 6,459,514 B2 | 10/2002 | Gilbert et al. | |
| 6,469,437 B1 | 10/2002 | Parthasarathy et al. | |
| 6,492,026 B1 | 12/2002 | Graff et al. | |
| 6,522,067 B1 | 2/2003 | Graff et al. | |
| 6,541,133 B1 | 4/2003 | Schicht et al. | |
| 6,565,982 B1 | 5/2003 | Ouderkirk et al. | |
| 6,573,652 B1 | 6/2003 | Graff et al. | |
| 6,576,349 B2 | 6/2003 | Lingle et al. | |
| 6,579,423 B2 * | 6/2003 | Anzaki et al. | 204/192.15 |
| 6,635,989 B1 | 10/2003 | Nilsson et al. | |
| 6,641,900 B2 | 11/2003 | Hebrink et al. | |
| 6,650,478 B1 | 11/2003 | DeBusk et al. | |
| 6,673,438 B1 | 1/2004 | Bond et al. | |
| 6,679,971 B2 | 1/2004 | Tone et al. | |
| 6,737,154 B2 | 5/2004 | Jonza et al. | |

| | | | |
|---|---|---|---|
| 6,783,349 B2 | 8/2004 | Neavin et al. | |
| 6,808,658 B2 | 10/2004 | Stover | |
| 6,818,291 B2 | 11/2004 | Funkenbusch et al. | |
| 6,833,391 B1 | 12/2004 | Chisholm et al. | |
| 6,929,864 B2 | 8/2005 | Fleming et al. | |
| 6,933,051 B2 | 8/2005 | Fleming et al. | |
| 6,946,188 B2 | 9/2005 | Hebrink et al. | |
| 6,965,191 B2 | 11/2005 | Koike et al. | |
| 7,148,360 B2 | 12/2006 | Flynn et al. | |
| 7,150,907 B2 | 12/2006 | Hebrink et al. | |
| 7,169,328 B2 | 1/2007 | Miller et al. | |
| 7,186,465 B2 | 3/2007 | Bright | |
| 7,238,401 B1 | 7/2007 | Dietz | |
| 7,241,506 B2 | 7/2007 | Hartig | |
| 7,261,950 B2 | 8/2007 | Fleming et al. | |
| 7,276,291 B2 | 10/2007 | Bright | |
| 7,351,479 B2 | 4/2008 | Funkenbusch et al. | |
| 7,393,557 B2 | 7/2008 | Fleming et al. | |
| 2001/0010846 A1 | 8/2001 | Hofmeister et al. | |
| 2002/0022156 A1 | 2/2002 | Bright | |
| 2003/0184222 A1 | 10/2003 | Nilsson et al. | |
| 2003/0228476 A1 | 12/2003 | Buhay et al. | |
| 2004/0032658 A1 | 2/2004 | Fleming | |
| 2004/0033369 A1 | 2/2004 | Fleming et al. | |
| 2004/0241396 A1 | 12/2004 | Jing et al. | |
| 2005/0181123 A1 | 8/2005 | Fleming et al. | |
| 2006/0035073 A1 | 2/2006 | Funkenbusch et al. | |
| 2006/0055308 A1 | 3/2006 | Lairson et al. | |
| 2006/0275613 A1 | 12/2006 | Butz et al. | |
| 2008/0008893 A1 | 1/2008 | Bright | |
| 2008/0160185 A1 | 7/2008 | Endle et al. | |
| 2009/0109537 A1* | 4/2009 | Bright et al. | 359/588 |
| 2010/0089621 A1* | 4/2010 | Stoss et al. | 174/254 |

FOREIGN PATENT DOCUMENTS

| | | |
|---|---|---|
| DE | 196 03 746 | 4/1997 |
| EP | 0 260 626 | 3/1988 |
| EP | 0 332 717 | 9/1989 |
| EP | 0 340 935 | 11/1989 |
| EP | 0 390 540 | 10/1990 |
| EP | 0 299 753 | 2/1993 |
| EP | 0 547 550 | 6/1993 |
| EP | 0 590 467 | 4/1994 |
| EP | 0 691 553 A2 | 1/1996 |
| EP | 0 722 787 | 7/1996 |
| EP | 0 787 826 | 8/1997 |
| EP | 0 810 452 | 12/1997 |
| EP | 0 873 839 | 10/1998 |
| EP | 0 916 394 | 5/1999 |
| EP | 0 931 850 | 7/1999 |
| EP | 0 944 299 | 9/1999 |
| EP | 0 977 167 | 2/2000 |
| EP | 0 977 469 | 2/2000 |
| GB | 1446849 | 8/1976 |
| JP | 57-159645 | 10/1982 |
| JP | 59-70558 | 4/1984 |
| JP | 61-3743 | 1/1986 |
| JP | 61-43555 | 3/1986 |
| JP | 61-79644 | 4/1986 |
| JP | 61-277114 | 12/1986 |
| JP | 62-217506 | 9/1987 |
| JP | 63-136316 | 6/1988 |
| JP | 64-18441 | 1/1989 |
| JP | 2-183230 | 7/1990 |
| JP | 4-369 | 1/1992 |
| JP | 4-48515 | 2/1992 |
| JP | 4-230906 | 8/1992 |
| JP | 6-136159 | 5/1994 |
| JP | 6-251631 | 9/1994 |
| JP | 8-325713 | 12/1996 |
| JP | 9-59763 | 3/1997 |
| JP | 9-291356 | 11/1997 |
| JP | 10-13083 | 1/1998 |
| WO | 87/07848 | 12/1987 |
| WO | 92/12219 | 7/1992 |
| WO | 95/10117 | 4/1995 |
| WO | 97/01440 | 1/1997 |
| WO | 97/01778 | 1/1997 |
| WO | 97/04885 | 2/1997 |
| WO | 97/16053 | 5/1997 |
| WO | 97/22631 | 6/1997 |
| WO | 97/37844 | 10/1997 |
| WO | 98/10116 | 3/1998 |
| WO | 98/18852 | 5/1998 |
| WO | 98/26927 | 6/1998 |
| WO | 99/16557 | 4/1999 |
| WO | 99/16931 | 4/1999 |
| WO | 99/36248 | 7/1999 |
| WO | 99/36262 | 7/1999 |
| WO | 00/26973 | 5/2000 |
| WO | 00/36665 | 6/2000 |
| WO | 00/48749 | 8/2000 |
| WO | 01/31393 | 5/2001 |
| WO | 01/58989 | 8/2001 |
| WO | 01/96104 | 12/2001 |
| WO | 2008/083304 | 7/2008 |
| WO | 2008/083308 | 7/2008 |
| WO | 2008/112451 | 9/2008 |
| WO | 2011/017039 | 2/2011 |

OTHER PUBLICATIONS

*Magazine Article*: Lewis, Jay et al., "Highly Flexibletransparent Electrodes for Organic Light-Emitting Diode-Based Displays," Applied Physics Letters, Oct. 18, 2004, vol. 85, No. 16, pp. 3450-3452.

*Journal*: Han, H. et al., Improved Conductivity and Mechznism of Carrier Transport in Zinc Oxide With Embedded Silver Layer, Journal of Applied Physics 103, (2008), 8 pages.

*Journal*: Sahu, D. R. et al., "ZnO/Ag/ZnO Multilayer Films for the application of a Very Low Resistance Transparent Elecrode," Applied Surface Science 252, (2006), 6 pages.

*Journal*: Sahu, D. R. et al., "Study on the Electrical and Optical Properties of Ag/Al—Doped ZnO Coatings Deposited by Electron Beam Evaporation," Applied Surface Science 253, (2007), 5 pages.

A.S. da Silva Sobrinho et al., "Transparent Barrier Coatings on Polyethylene Terephthalate by Single-and Dual-Frequency Plasma-Enhanced Chemical Vapor Deposition," *J. Vac. Sci. Technol.*, A 16(6), Nov./Dec. 1998, pp. 3190-3198.

"Phase Imaging: Beyond Topography," Application Notes, date unknown, (2 pages).

Affinito et al., "A New Method for Fabricating Transparent Barrier Layers," *Thin Solid Films*, (1996), pp. 63-67, vol. 290/291, Elsevier Science S.A.

Affinito et al., "A New Technique for Fabrication of Nonlinear Optical Polymer Thin Films and a Cost Effective Fabrication Method for Nonlinear Optical Waveguides", FY97 Laboratory Directed Research and Development Proposal, (1997), pp. 1-4.

Affinito et al., "Comparison of Surface Treatments of PET and PML", SVC 40th Annual Technical Conference, Paper No. W-05, Proceedings of the Society of Vacuum Coaters, Vacuum Web Coating Session, (1997), (4 pages).

Affinito et al., "Electrochromic Oxides for Wide Area Switchable Camouflage, Windows, and Mirrors", FY97 IR&D Investment Proposal, Material Sciences Department/EMSL, (1997), pp, 1-6.

Affinito et al., "High Rate Vacuum Deposition of Polymer Electrolytes," *J. Vac. Sci. Technol.*, A 14(3), (May/Jun., 1996), pp. 733-738.

Affinito et al., "Low Cost Wide Area Light Emitting Polymer Device Fabrication with PML and LML Process Technology", Battelle Pacific Northwest National Laboratory, (Aug. 1996), pp. 1-19.

Affinito et al., "PML/Oxide/PML Barrier Layer Performance Differences Arising From Use of UV or Electron Beam Polymerization of the PML Layers," *Thin Solid Films*, (1997), pp. 19-25, vol. 308-309, Elsevier Science S.A.

Affinito et al., "Polymer/Polymer, Polymer/Oxide, and Polymer/Metal Vacuum Deposited Interference Filters," Tenth International Vacuum Web Coating Conference, Battelle Pacific Northwest Laboratory, (Nov. 10-12, 1996), pp. 0-14.

Affinito et al., "Polymer-Oxide Transparent Barrier Layers," 39th Annual Technical Conference Proceedings, (1996), pp. 392-397, Society of Vacuum Coaters.

Affinito et al., "Vacuum Deposited Polymer/Metal Multilayer Films for Optical Application," *Thin Solid Films*, vol. 270 (1995), pp. 43-48.

Affinito et al., "Vacuum Deposition of Polymer Electrolytes on Flexible Substrates," Proceedings of the Ninth International Conference on Vacuum Web Coating, (1995), pp. 20-36, ed. R. Bakish, Bakish Press.

Affinito, "Addendum to Attached White Paper on Polymer Multilayer Thin Film Deposition Technology," Mar. 9, 1993, pp. 1-5.

Affinito, "Application of PNL's PML Technology to Electrolyte and Advanced Battery Fabrication," Battelle Pacific Northwest Laboratories, Apr. 25, 1994, pp. 1-4.

Affinito, "Battelle Coating Capabilities and Experience," Battelle, Pacific Northwest Laboratories, (1994), (18 pages).

Affinito, "Extremely High Rate Deposition of Polymer Multilayer Optical Thin Film Materials," Battelle Pacific Northwest Laboratory, Jan. 4, 1991, (48 pages).

Affinito, "Li-Polymer Batteries Fabricated with New Materials and New Processing Technology, with Greater than 1200 WHr/I Capacity," Proposal Response to BAA 94-1, Battelle, Pacific Northwest Laboratory, Jan. 1994, pp. 1-21.

Affinito, "Using Lateral Force Microscopy as a Means to Obtain Information about Pinhole Formation in $Al_2O_3$ Barrier Layers Deposited on PET," May 5, 1997, (4 pages).

Affinito, "Vacuum Deposited Polymer/Silver Reflector Material", SPIE, (Jul. 1994), pp. 276-283, vol. 2262, Battelle, Pacific Northwest Laboratory, Materials Sciences Department.

Affinito, et al., "Molecularly Doped Polymer Composite Films for Light Emitting Polymer Applications Fabricated by the PML Process", $41^{st}$ Annual Technical Conference Proceedings (1998), pp. 220-225, Society of Vacuum Coaters.

Affinito, et al., "Ultrahigh Rate, Wide Area, Plasma Polymerized Films From High Molecular Weight/Low Vapor Pressure Liquid or Solid Monomer Precursors", *J. Vac. Sci. Technol.*, A 17 (4), Jul./Aug. 1999, pp. 1974-1981.

Affinito, et al., "Vacuum Deposited Conductive Polymer Films", The Eleventh International Conference on Vacuum Web Coating, Nov. 9-11, 1997, pp. 201-212.

Affinito, letter to Peter Erickson re: transmittal of literature, May 9, 1997, with an Affinito letter providing an overview of the content of the collection of literature concerning Battelle Pacific Northwest National Laboratory's PML and LML technology for the vacuum deposition of polymer films, May 5, 1997, (4 pages).

Baouchi et al., "Comparison of Non-Reactive and Reactive ITO Sputtering in a High Volume Production Environment", Donnelly Applied Films Corporation, SID 1995 Conference, pp. 89-90.

Barnes et al., "Advanced Materials for Electronic Applications by Polymerization of Cyclic Olefins Using Late Transition Metal Catalysts," (Jun. 10-1, 1998), pp. 1-13.

Blocher, Jr., Chapter 8, "Chemical Vapor Deposition", Deposition Technologies for Films and Coatings, Developments and Applications, (1982), pp. 335-364, Noyes Publications, New Jersey.

Bonifield, Chapter 9, "Plasma Assisted Chemical Vapor Deposition", Deposition Technologies for Films and Coatings, Developments and Applications, (1982), pp. 365-384, Noyes Publications, New Jersey.

Bright et al., "Transparent and Conductive Ultra-Barrier Coatings for Flexible Plastic Display", Delta V Technologies, Inc., American Vacuum Society $46^{th}$ International Symposium, Seattle, WA, (Oct. 25-29, 1999), (20 pages).

Bright et al., "Transparent Barrier Coatings Based on ITO for Flexible Plastic Displays", (1999), Delta V Technologies, Inc., (18 pages).

Bright, Society of Vacuum Coaters Short Course on "Deposition and Properties of ITO and Other Transparent Conductive Coatings", (1996), Delta V Technologies, Inc., (123 pages).

Cairns et al., "Strain-dependent electrical resistance of tin-doped indium oxide on polymer substrates", *Applied Physics Letters*, vol. 76, No. 11, Mar. 13, 2000, pp. 425-427.

Chahroudi et al., "Transparent Glass Barrier Coating for Flexible Film Packaging", Society of Vacuum Coaters 505/298-7624, $34^{th}$ Annual Technical Conference Proceedings (1991), pp. 130-133.

Chatham, "Review Oxygen Diffusion Barrier Properties of Transparent Oxide Coatings on Polymeric Substrates," *Surface & Coatings Technology* (1996), pp. 1-9, vol. 78.

Comer, "The Impact of Visual Anomalies on the Barrier Properties of Metallized Biaxially Oriented Polypropylene Film," (1995), $38^{th}$ Annual Technical Conference Proceedings, Society of Vacuum Coaters 505/856-7188, pp. 59-60.

Deshpandey et al., "Evaporation Processes", *Thin Film Processes II*, Academic Press, Inc., Chapter 11-2, (1991), pp. 79-132.

Gilbert et al., "Comparison of ITO Sputtering Process from Ceramic and Alloy Targets onto Room Temperature Pet Substrates," Society of Vacuum Coaters, $36^{th}$ Annual Technical Conference Proceedings, (1993), pp. 236-241.

Gustafsson et al., "Flexible Light-Emitting Diodes Made From Soluble Conducting Polymers," *Nature*, vol. 357, Jun. 11, 1992, pp. 477-479.

Heil, "Mechanical Properties of PECVD Silicon-Oxide Based Barrier Films on PET," (1995), $38^{th}$ Annual Technical Conference Proceedings, Society of Vacuum Coaters, 505/856-7188, p. 33.

Hollahan et al., "Plasma Deposition of Inorganic Thin Films," *Thin Film Processes*, Academic Press, Chapter IV-1, (1978), pp. 335-360.

Inoue et al., "Fabrication of a Thin Film of MNA by Vapour Deposition," (1990), pp. 177-179, The $33^{rd}$ Japan Congress on Materials Research.

Johnson, "The Cathodic Arc Plasma Deposition of Thin Films", *Thin Film Processes II*, Academic Press, Inc., Chapter II-5, (1991), pp. 209-280.

King, "Defrosting of Automobile Windshields Using High Light Transmitting Electro Conducting Films", Society of Automotive Engineers, 1974, pp. 1-5.

Knoll et al., "Effects of Process Parameters on PECVD Silicon Oxide and Aluminum Oxide Barrier Films," (1995), $38^{th}$ Annual Technical Conference Proceedings, Society of Vacuum Coaters 505/856-7188, pp. 425-426 and 430.

Langowski, "Transparent Barrier Coatings for Flexible Packagings: Industrial and Research Activities in Germany," (1996), $39^{th}$ Annual Technical Conference Proceedings, Society of Vacuum Coaters 505/856-7188, pp. 398 and 415.

Lohwasser et al., "Electron-Beam Oxide Coating on Plastic Films for Packaging, Development, Production and Application," (1995), $38^{th}$ Annual Technical Conference Proceedings, Society of Vacuum Coater 505/856-7188, pp. 40-41.

Macleod, "Antireflection Coatings", *Thin-Film Optical Filters*, Macmillan Publishing Co., Second Edition, (1986), pp. 71-136.

Mahon et al., "Requirements of Flexible Substrates for Organic Light Emitting Devices in Flat Panel Display Applications", $42^{nd}$ Annual Technical Conference Proceedings, (1999), pp. 456-459, Society of Vacuum Coaters 505/856-7188.

Mattox, Chapter 6, "Ion Plating Technology", Deposition Technologies for Films and Coatings, Developments and Applications, (1982), pp. 244-287, Noyes Publications, New Jersey.

McGraw-Hill *Multimedia Encyclopedia of Science & Technology*, "Electronic Display," (1998), pp. 1-8.

McGraw-Hill *Multimedia Encyclopedia of Science & Technology*, "Electroluminescence," (1998), pp. 1-3.

McGraw-Hill *Multimedia Encyclopedia of Science & Technology*, "Light-Emitting Diode," (1998), pp. 1-3.

McGraw-Hill *Multimedia Encyclopedia of Science & Technology*, "Liquid Crystals," (1998), pp. 1-5.

McGraw-Hill *Multimedia Encyclopedia of Science & Technology*, "Printed Circuit," (1998), pp. 1-13.

McGraw-Hill *Multimedia Encyclopedia of Science & Technology*, "Sputtering," (1998), pp. 1-3.

Misiano et al., "Inexpensive Transparent Barrier Coatings on Plastic Substrates," (1996), $39^{th}$ Annual Technical Conference Proceedings, Society of Vacuum Coaters 505/856-7188, pp. 413 and 399.

O'Mara, Liquid Crystal Flat Panel Displays, *Manufacturing Science & Technology*, (1993), Van Nostrand Reinhold Publishing, New York, pp. 21-35, 66-70, 73, 93, 96, 116-117, 123-125, 144-145, 149-150, and 165-175.

Parsons, "Sputter Deposition Processes", *Thin Film Processes II*, Academic Press, Inc., Chapter 11-4, (1991), pp. 177-207.

Penning, *Electrical Discharges in Gases*, Gordon and Breach, Science Publishers, (1965), Chapters V-VI, pp. 19-35; and Chapter VIII, pp. 41-50.

Product Information: EMI Shielding Products, Advanced Performance Materials (APM), 2 pages.
Product Information: Shielded Windows, Advanced Performance Materials (APM), 1 page.
Product Information: BE 9 Shielded Windows, APM Bavaria GmbH, pp. 60-67.
Product Information: Southwall™ Altair™ M Transparent Conductive Film, 1 page.
Product Information: Display Products, Southwall Technologies, 2 pages.
Reif, "Plasma-Enhanced Chemical Vapor Deposition", *Thin Film Processes II*, Academic Press, Inc., Chapter IV-1, (1991), pp. 525-564.
Shaw et al., "A New High Speed Process for Vapor Depositing Acrylate Thin Films: An Update," Society of Vacuum Coaters 36th Annual Technical Conference (1993), pp. 348-352.
Shaw et al., "A New Vapor Deposition Process for Coating Paper and Polymer Webs," Catalina Coatings, Inc., (1992), pp. 96-102.
Shaw et al., "Use of Evaporated Acrylate Coatings to Smooth the Surface of Polyester and Polypropylene Film Substrates," *Rad Tech*(1996), (12 pages).
Shaw et al., "Use of Vapor Deposited Acrylate Coatings to Improve the Barrier Properties of Metallized Film," Society of Vacuum Coaters 37th Annual Technical Conference (1994), pp. 240-244.
Shi, et al., "In-Situ and Real-Time Monitoring of Plasma-Induced Etching of PET and Acrylic Films", *Plasmas and Polymers*, vol. 4, No. 4, (1999), pp. 247-258.
Shi, et al., "Plasma Treatment of PET and Acrylic Coating Surfaces: I. In-Situ XPS Measurements", *Journal of Adhesion Science and Technology*, vol. 14, No. 12, (2000), pp. 1485-1498.
Technological Information: EMI Theory, Chomerics, 3 pages.
Technological Information: Shielding Methods, Chomerics, 7 pages.
Thornton, Chapter 5, "Coating Deposition by Sputtering", *Deposition Technologies for Films and Coatings, Developments and Applications*, (1982), pp. 170-243, Noyes Publications, New Jersey.
Tropsha et al., "Activated Rate Theory Treatment of Oxygen and Water Transport Through Silicon Oxide/Poly(ethylene terephthalate) Composite Barrier Structures", *J. Phys. Chem. B*, vol. 101, No. 13, (1997), pp. 2259-2266.
Tropsha, et al., "Combinatorial Barrier Effect of the Multilayer $SiO_x$ Coatings on Polymer Substrates", Society of Vacuum Coaters, 40th Annual Technical Conference Proceedings (1997), pp. 64-69.
Vossen et al., "Glow Discharge Sputter Deposition," *Thin Film Processes*, Academic Press, Inc., Chapter 11-1, (1978), pp. 12-73.
Yamada et al., "The Properties of a New Transparent and Colorless Barrier Film," (1995), 38th Annual Technical Conference Proceedings, Society of Vacuum Coaters, pp. 28-29.
Yasuda, "Glow Discharge Polymerization", *Thin Film Processes*, Academic Press, Inc., Chapter IV-2, (1978), pp. 361-398.

\* cited by examiner

ULTRATHIN TRANSPARENT EMI SHIELDING FILM COMPRISING A POLYMER BASECOAT AND CROSSLINKED POLYMER TRANSPARENT DIELECTRIC LAYER

FIELD

Provided are multi-component films useful as optical display filters. The optical display filters can be useful as components of active optical devices such as display panels including liquid crystal display panels.

BACKGROUND

The use of electronic devices that include flat panel displays is very popular and is increasing at an accelerating rate. These electronic devices include, for example, flat panel displays that contain electroluminescent (EL) lamps, light-emitting diodes (LEDs), organic light-emitting diodes (OLEDs), or liquid crystal displays. Most of these displays require multiple filters to adjust performance characteristics of the display that include the degree of neutrality and level of transmitted color, the level of reflected radiation, and the transmission levels of undesirable near infrared and electromagnetic interference (EMI) radiation.

Optical filters with EMI shielding have been developed that can modify visible radiation, infrared radiation, adjust color, reduce reflection, and can shield the observer from harmful (EMI) radiation. Usually a number of different optical filters in combination with EMI shielding films, especially films with transparent conductive mesh configurations, have been used to produce the final, desired visual output of the device. Some of these optical filters have employed interference stacks (e.g., Fabry-Perot) of alternating conductors and dielectrics to adjust the optical performance characteristics of the filters, while also providing EMI shielding. The conductors in these stacks are usually metal layers and the dielectrics are usually metal oxides layers. The metal oxide layers can have a very slow deposition rate which can lead to high production costs. The use of multiple optical filters in electronic devices to obtain desired performance characteristics can increase costs, make the devices bulky, and cause considerable loss in transmission of the desired images.

SUMMARY

There is a need for optical filters useful for electronic display devices that are lightweight, low-cost, and that can incorporate multiple desired features into one filter. Also there is a need for optical filters that can be easily tailored during production to adjust visible reflection, visible transmission, and to provide EMI protection without adding more components or cost to the electronic display device. There is also a need for optical filters than can be easily applied to existing electronic display devices. The use of the provided optical filters with EMI shielding can offer a versatile approach to replacement of multiple optical film layers and EMI shielding to meet the requirements of certain optical displays such as, for example, display panels for use in hand-held devices such as mobile phones.

Provided is an optical display filter that includes a transparent polymeric substrate, a multi-layer construction adjacent to the substrate, the construction consisting essentially of an electrically-conductive layer having a first surface and a second surface; a nucleation layer in contact with the first surface; and a barrier layer in contact with the second surface, and a transparent dielectric layer adjacent to the construction. The provided filter can have antireflective layers and components built into it to increase transmission of visible light. The filter can also provide EMI shielding when included in or placed on a display panel, touch panel, or an electronic device.

In this document the articles "a", "an", and "the" are used interchangeably with "at least one" to mean one or more of the elements being described;

"adjacent" refers to layers in the provided filters that are in proximity to other layers. Adjacent layers can be contiguous or can be separated by up to three intervening layers;

"alloy" refers to a composition of two or more metals that have physical properties different than those of any of the metals by themselves;

"barrier layer" refers to a layer or a combination of layers that prevent or retard the diffusion of moisture or corrosive agents;

"contiguous" refers to touching or sharing at least one common boundary;

"dielectric" refers to material that is less conductive than metallic conductors such as silver, and can refer to transparent semiconducting materials, and insulators (including polymers); and "electromagnetic interference (EMI) shielding" refers to the reflection of electromagnetic waves by an electrically-conductive layer.

The optical display filters described herein can exhibit one or more advantages by providing lightweight, low-cost films that can be easily applied to an electronic display device and that can provide multiple features in one filter. These advantages can include low average reflection of less than 8% of actinic radiation between the wavelengths of 450 nm and 650 nm, high average transmission of above 85% of actinic radiation between the wavelengths of 450 nm and 650 nm, and average effective EMI shielding with sheet resistance of less than 300 ohms/square. The provided filters can be useful on many electronic devices and can be particularly useful on liquid crystal display panels and touch screen panels such as those used on mobile hand-held phones.

The details of one or more embodiments are set forth in the accompanying drawings and description below. Other features, objects, and advantages will be apparent from the description and drawings, and from the claims.

DETAILED DESCRIPTION

Figure 1:
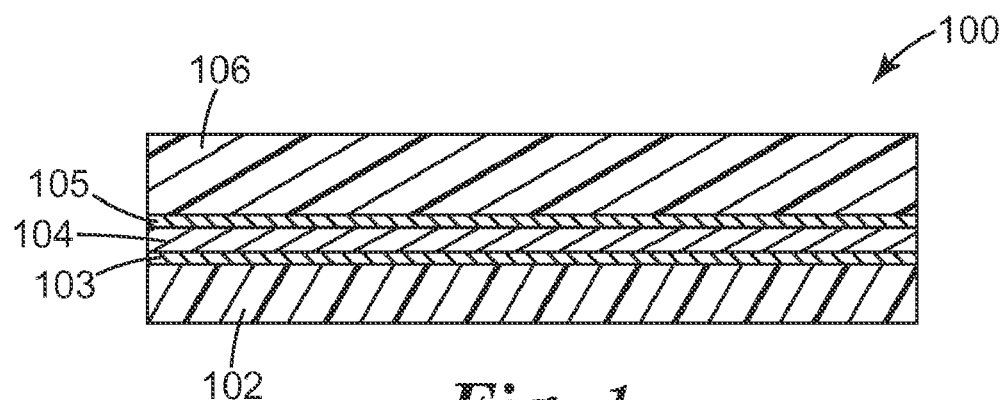
FIGS. 1-6 are illustrations of different embodiments of the provided optical display filters.

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art using the teachings disclosed herein. The use of numerical ranges by endpoints includes all numbers within that range (e.g. 1 to 5 includes 1, 1.5, 2, 2.75, 3, 3.80, 4, and 5) and any range within that range.

Provided are multi-component films useful as optical display filters. The optical display filters can be useful as components of active optical devices such as display panels including liquid crystal display panels. The multi-component films include a transparent substrate. A variety of substrates can be employed. The substrates can be transparent, smooth or textured, uniform or non-uniform, and/or flexible or rigid. Preferred are substrates that are highly transparent, smooth, uniform, and flexible. Substrates can also contain other coatings or compounds, for example, abrasion-resistant coatings (hardcoats) or absorbing dyes. Preferred substrates are flexible materials that can be roll-to-roll processed. Preferred supports also can have a visible light transmission of at least about 85% at 550 nm. Particularly preferred supports are flexible plastic materials including thermoplastic films such as polyesters (e.g., PET), polyacrylates (e.g., poly(methyl methacrylate), PMMA), polycarbonates, polypropylenes, high or low density polyethylenes, polyethylene naphthalates, polysulfones, polyether sulfones, polyurethanes, polyamides, polyvinyl butyral, polyvinyl chloride, polyvinylidenedifluoride (PVDF), fluorinated ethylene propylene (FEP), and polyethylene sulfide; and thermoset films such as cellulose derivatives, polyimides, polyimide benzoxazoles, polybenzoxazoles, and high $T_g$ cyclic olefin polymers. The supports can also include a transparent multilayer optical film ("MOF") provided thereon with at least one crosslinked polymer layer, such as those described in U.S. Pat. No. 7,215,473 (Fleming). Supports made of PET are especially preferred. Preferably the support has a thickness of about 0.01 mm to about 1 mm.

The provided optical display filters include a multi-layer construction disposed either directly on the substrate or, optionally, with a basecoat polymer layer between the substrate and the multi-layer construction. The multi-layer construction consists essentially of, an electrically-conductive layer having a first surface and a second surface, a nucleation layer in contact with the first surface, and a barrier layer in contact with the second surface. The multi-layer construction can be located on the substrate, on a basecoat layer applied to the substrate, or any other layer or layers applied to the substrate or basecoat layers. These other layers can include any of the functional coatings described herein or combinations thereof.

It can be advantageous to deposit a nucleation layer just prior to the deposition of the electrically conductive layer. This layer can be deposited on the substrate, the basecoat layer, the abrasion-resistant layer, or on any functional layers. It is especially preferred to deposit a nucleation layer on a basecoat layer, to produce optical filters that can have high optical transmission and high electrical conductivity with a metal electrically-conductive layer, particularly when the metal is a very good conductor such as silver or silver alloy. The use of zinc oxide or aluminum-doped zinc oxide (AZO) as a nucleation or seed layer on the basecoat layer or on organic layers contiguous to the metallic layers of the multi-layer construction used in the provided filter is described more fully in U.S. Pat. Publ. No. 2010/089621 (Stoss et al.). Other materials useful as a nucleation or seed layer can be transparent conductive metal oxides (TCOs) such as indium oxide, indium-tin oxide, indium-zinc oxide, zinc oxide with other dopants such as gallium and/or boron, zinc-tin oxide (zinc stannates), or other TCOs, or combinations thereof The electrically-conductive layer can include a conductive elemental metal, a conductive metal alloy, a conductive metal oxide, a conductive metal nitride, a conductive metal carbide, or a conductive metal boride, or combinations of these materials and can be disposed directly upon the nucleation layer. Preferred conductive metals include elemental silver, copper, aluminum, gold, palladium, platinum, nickel, rhodium, ruthenium, aluminum, and zinc, with silver being especially preferred. Alloys os these metals such as silver-gold, silver-palladium, silver-gold-palladium, or dispersions containing these metals in admixture with one another or with other metals also can be employed. TCO, such as indium-tin-oxide (ITO), indium-zinc-oxide (IZO), zinc oxide with or without dopants such as aluminum, gallium and boron, other TCOs, or combinations thereof can also be used as an electrically-conductive layer. When conductive metal oxides are used as an electrically-conductive layer, the dielectric layer can have a resistivity that is at least about 100 times higher than the resistivity of the metal oxide. Preferably the physical thickness of the electrically-conductive metallic layer or layers is from about 3 nm to about 50 nm, more preferably from about 5 nm to about 20 nm, whereas the physical thickness of TCO layers are from about 10 nm to about 500 nm, more preferably from about 20 nm to about 300 nm. Typically the electrically-conductive layer or layers are formed using techniques employed in the film metallizing art such as sputtering (e.g., planar or rotary magnetron sputtering), evaporation (e.g., resistive or electron beam evaporation), chemical vapor deposition (CVD), metallorganic CVD (MOCVD), plasma-enhanced, assisted, or activated CVD (PECVD), ion sputtering, and the like. The electrically-conductive layer can provide a sheet resistance of less than 300 ohms/square, less than 200 ohms/square, or even less than 100 ohms/square to the filter.

The multi-layer construction can include a barrier layer in contact with the second surface of the electrically-conductive layer. The barrier layer can provide environmental protection to the electrically-conductive layer. The barrier layer can include chemical treatments of the electrically-conductive layer. Appropriate chemical treatments of metal layer surfaces and interfaces can help to improve corrosion resistance. Such treatments can be combined with adhesion promoting treatments using similar or different materials, and with plasma treatments, diffusion barriers, and nucleating layers. One or more corrosion inhibiting compounds can be included in the support, the polymers layers, the adhesive, and/or the abrasion-resistant coating. Improved corrosion resistance can be accomplished by exposing a metal surface or interface to a compound such as a mercaptan, a thiol-containing compound, an acid (such as carboxylic acids or organic phosphoric acids), a triazole, a dye, a wetting agent, an organic sulfide, or a disulfide, ethylene glycol bis-thioglycolate, a benzotriazole or one of its derivatives such as are described in U.S. Pat. No. 6,376,065 (Korba et al.), U.S. Pat. No. 7,148,360 (Flynn et al.), 2-mercaptobenzoxazole, 1-phenyl-1H-tetrazole-5-thiol, and glycol dimercaptoacetate as described in U.S. Pat. No. 4,873,139 (Kinosky), and U.S. Pat. No. 6,357,880 (Epstein et al.).

It has been found that a thin layer of material that can be similar in chemistry and application to the nucleation layer can act as a barrier layer to provide corrosion protection to the electrically-conductive layer. The barrier layer can include materials that are also useful as a nucleation layer such as ITO, IZO, zinc oxide with or without dopants such as aluminum, gallium, and boron, zinc-tin-oxide, $ZnSnO_3$, $Zn_2SnO_4$, $In_2O_3$, SnO2, indium-tin-oxide, and combinations thereof. When the electrically-conductive layer includes silver, zinc oxide (ZnO) can be an effective barrier layer—even when it is non-continuous and applied in a manner identical to the nucleation layer. It is also contemplated that the barrier layer can be thicker, even significantly thicker, than the nucleation layer as long as it preserves transparency of the filter. The barrier layer of the provided filters can also include a transparent polymer layer in combination and adjacent to the metal oxide barrier layer described herein. In this embodiment, the transparent polymer layer can provide extra environmental protection. This layer can include any transparent polymers that have low moisture transmission rates and include, preferably, crosslinked acrylic polymers such as those described below for use in the dielectric layer The dielectric layer can be any thin layer that has a resistivity of at least 100 times higher than that of the electrically-conductive layer. Preferred dielectric layers are highly transparent to visible radiation. Useful dielectric layers can include materials such as metal oxides, metal nitrides, metal carbides, metal borides, metal oxynitrides, metal oxycarbides, metal oxyborides, and combinations thereof, e.g., silicon oxides, aluminum oxides, titanium oxides, hafnium oxides, indium oxides, tin oxides, zinc oxide, indium-tin oxide (ITO), indium-zinc oxide, tantalum oxide, zirconium oxide, niobium oxide, boron carbide, tungsten carbide, silicon carbide, aluminum nitride, silicon nitride, boron nitride, aluminum oxynitride, silicon oxynitride, boron oxynitride, zirconium oxyboride, titanium oxyboride, and combinations thereof.

The dielectric layer can include a transparent organic polymer layer. Particularly useful dielectric layers include a transparent organic polymer layer having a refractive index greater than about 1.49. The organic layer can be selected from polymers, organometallic materials and organic-inorganic hybrid materials. Preferred polymers include conjugated ppolymers with an index greater than 1.55. Examples of organometallic and organic-inorganic hybrid materials are described in PCT Appl. No. PCT/US07/089,088 (Maki et al.). For the present optical filters, polymers, especially crosslinked polymers, are preferred as the dielectric layer in order to meet the optical requirements of transparent EMI shielding, for example, when the filters are used as liquid crystal display panel filters. Examples of crosslinked polymers that are useful in the optical filters of this invention are disclosed in U.S. Pat. No. 6,818,291 (Funkenbusch et al.).

Useful crosslinked polymeric layers can be formed from a variety of organic materials. Preferably the polymeric layer is crosslinked in situ atop barrier layer. If desired, the polymeric layer can be applied using conventional coating methods such as roll coating (e.g., gravure roll coating) or spray coating (e.g., electrostatic spray coating), then crosslinked using, for example, UV radiation. Most preferably the polymeric layer can be formed by flash evaporation, vapor deposition and crosslinking of a monomer as described above for the basecoat layer. Volatilizable acrylamides (such as those disclosed in U.S. patent application Ser. No. 11/857,541 (Endle et al.)) and (meth)acrylate monomers are preferred for use in such a process, with volatilizable acrylate monomers being especially preferred. Fluorinated (meth)acrylates, silicon (meth)acrylates and other volatizable, free radical-curing monomers can be used. Coating efficiency can be improved by cooling the support. Particularly preferred monomers include multifunctional (meth)acrylates, used alone or in combination with other multifunctional or monofunctional (meth)acrylates, such as phenylthioethyl acrylate, hexanediol diacrylate, ethoxyethyl acrylate, phenoxyethyl acrylate, cyanoethyl (mono) acrylate, isobornyl acrylate, isobornyl methacrylate, octadecyl acrylate, isodecyl acrylate, lauryl acrylate, beta-carboxyethyl acrylate, tetrahydrofurfuryl acrylate, dinitrile acrylate, pentafluorophenyl acrylate, nitrophenyl acrylate, 2-phenoxyethyl acrylate, 2-phenoxyethyl methacrylate, 2,2,2-trifluoromethyl(meth)acrylate, diethylene glycol diacrylate, triethylene glycol diacrylate, triethylene glycol dimethacrylate, tripropylene glycol diacrylate, tetraethylene glycol diacrylate, neopentyl glycol diacrylate, propoxylated neopentyl glycol diacrylate, polyethylene glycol diacrylate, tetraethylene glycol diacrylate, bisphenol A epoxy diacrylate, 1,6-hexanediol dimethacrylate, trimethylol propane triacrylate, ethoxylated trimethylol propane triacrylate, propylated trimethylol propane triacrylate, 2-biphenyl acrylate, tris(2-hydroxyethyl)-isocyanurate triacrylate, pentaerythritol triacrylate, phenylthioethyl acrylate, naphthloxyethyl acrylate, Ebecryl 130 cyclic diacrylate (available from Cytec Surface Specialties, West Paterson, N.J.), epoxy acrylate RDX80095 (available from Rad-Cure Corporation, Fairfield, N.J.), CN120E50 and CN120C60 (both available from Sartomer, Exton, Pa.), and mixtures thereof. A variety of other curable materials can be included in the crosslinked polymeric layer, e.g., vinyl ethers, vinyl naphthylene, acrylonitrile, and mixtures thereof.

The dielectric layer can be applied using conventional coating methods such as roll coating (e.g., gravure roll coating) or spray coating (e.g., electrostatic spray coating), and then can be crosslinked using, for example, electron beam or UV radiation. Other conventional coating methods include, for example, solution casting, ink-jet printing, aerosol spraying, dip coating, and spin coating. Preferred methods are vacuum deposition techniques including, plasma polymerization, chemical vapor deposition (CVD, MOCVD, PECVD), vacuum sublimation, pulse laser deposition (PLD), pulse laser evaporation, polymer multilayer process (PML), liquid multilayer process (LML), and plasma polymer multiplayer process (PPML). The methods used for depositing the basecoat layer outlined above can be utilized for the organic layers.

In some embodiments, it is preferable to use a dielectric layer that includes a crosslinked acrylate polymer that has an index of refraction greater than 1.49, greater than 1.55, or even greater than 1.60. The use of an organic layer with a refractive index greater than 1.49 can improve the optical transmission of the filter and provide antireflection properties to the filter with some constructions. The use of high index polymers is discussed in more detail below for certain embodiments of the provided optical filters. Preferred polymers include conjugated polymers. Acrylates that can be used to produce high index organic layers can include a thioacrylate or a phenyl acrylate. Thioacrylate and phenyl acrylate monomers can be used to make curable acrylate compositions that have an index of refraction of greater than or equal to about 1.54, greater than or equal to about 1.56, greater than or equal to about 1.58, or even greater than or equal to about 1.60. A particularly useful thioacrylate is phenylthioethyl acrylate. A particularly useful phenyl acrylate is 2-biphenyl acrylate. Curable (meth)acrylate compositions with refractive index above 1.49 are disclosed, for example, in U.S. Pat. No. 6,833,391 (Chisholm et al.).

In other embodiments, it is preferable to use a dielectric layer that includes a polymer that has an index of refraction that is low (i.e., lower than about 1.47 or even lower than about 1.40). Examples of such materials include, for example, polymers that contain substantial amounts of fluorine such as those disclosed in U.S. Pat. Appl. No. 2006/0148996 (Coggio et al.). Other examples of low index, transparent polymers include silicone polymers. Any transparent, low index materials can be useful to make embodiments of the provided filters. The use of low index polymers is discussed in more detail below for certain embodiments of the provided optical filters.

The optical display filter can, optionally, include a dielectric basecoat layer disposed on the substrate. Basecoat layers that include crosslinked acrylate polymers, are especially preferred. Most preferably, the basecoat layer can be formed by flash evaporation and vapor deposition of a radiation-crosslinkable monomer (e.g., an acrylate monomer), followed by crosslinking in situ (using, for example, an electron beam apparatus, UV light source, electrical discharge apparatus or other suitable device), as is well known to those skilled in the art. If desired, the basecoat can also be applied using conventional coating methods such as roll coating (e.g., gravure roll coating) or spray coating (e.g., electrostatic spray coating), then crosslinked using, for example, UV radiation. The desired chemical composition and thickness of the basecoat layer will depend in part on the nature of the support. For example, for a PET support, the basecoat layer preferably is formed from an acrylate monomer and typically will have a thickness from about a few nanometers up to about 10 micrometers ($\mu$m).

The adhesion of the electrically-conductive layer (including the nucleation layer) of the multi-layer construction to the substrate or the basecoat layer, or an abrasion-resistant layer (hardcoat), if present, can be further improved by including an adhesion-promoter to the substrate or the basecoat layer or the hardcoat. The adhesion-promoting layer can be, for example, a separate polymeric layer or a metal-containing layer such as a layer of a metal, an alloy, an oxide, a metal oxide, a metal nitride, or a metal oxynitride such as those disclosed in U.S. Pat. No. 3,601,471 (Seddon) or U.S. Pat. No. 3,682,528 (Apfel et al.) and include, for example, Cr, Ti, Ni, NiCr alloys, or ITO. The adhesion-promoting layer can have a thickness of from a few nanometers (e.g., 1 nm or 2 nm) to about 10 nm, and can be thicker if desired. The interlayer adhesion-promoting layers that can be utilized may also act as diffusion barriers. Examples of adhesion promotion layers with diffusion barrier properties include TCOs such as ITO, aluminum, aluminum oxide, copper, copper oxides, silicon, silicon oxides, titanium, titanium oxides, titanium nitride, titanium tungstate, tantalum, tantalum oxides, tantalum nitride, chromium, chromium oxides, and silicon nitrides. Suitable adhesion-promoting additives include mercaptans, thiol-containing compounds, acids (such as carboxylic acids or organic phosphoric acids), triazoles, dyes, and wetting agents. Epoxy acrylates such as CN120E50 and CN120C60, ethylene glycol bis-thioglycolate, and phenylthioethyl acrylate (PTEA) are particularly preferred additives. The additive preferably is present in amounts sufficient to obtain the desired degree of increased adhesion, without causing undue oxidation or other degradation of electrically-conductive layers. Corona treatment or plasma discharge can also be used to increase adhesion.

The smoothness, continuity, and conductivity of the multi-layer construction and its adhesion to the substrate or basecoat layer preferably are enhanced by appropriate pretreatment of the substrate. A preferred pretreatment regiment involves electrical discharge pretreatment of the support in the presence of a reactive or non-reactive atmosphere (e.g., plasma, glow discharge, corona discharge, dielectric barrier discharge or atmospheric pressure discharge); chemical pretreatment; flame pretreatment; or application of a nucleating layer such as the oxides and alloys described in U.S. Pat. Nos. 3,601,471 and 3,682,528 and U.S. Pat. Publ. No. 2010/089621 (Stoss et al.). These pretreatments help ensure that the surface of the support will be receptive to the subsequently applied metal layer. Plasma pretreatment is particularly preferred for certain embodiments. Similar pretreatments or application of a nucleating layer are preferably used on each dielectric layer before deposition of each electrically-conducting layer.

Various functional layers or coatings can be added to the provided optical display filters to alter or to improve their physical or chemical properties, particularly when applied to the surface of the filter or to the opposite side of the substrate. Such layers or coatings can include, for example, low friction coatings (see for example, U.S. Pat. No. 6,744,227 (Bright et al.)) or slip particles to make the filter easier to handle during manufacturing; particles to add abrasion-resistance or diffusion properties to the filter or to prevent wet-out or Newton's rings when the film is placed next to another film or surface; antireflection layers to prevent glare when the optical display filter is applied to the face of an information display; optical polarizers, antistatic coatings; abrasion resistant or hardcoat materials; anti-fogging materials; magnetic or magneto-optic coatings or films; adhesives such as pressure-sensitive adhesives or hot melt adhesives especially if they are optically clear adhesives such as those disclosed, for example, in U.S. Pat. No. 6,887,917 (Yang et al.), U.S. Pat. Publ. No. 2006/0134362 (Lu et al.) or other available from, for example, 3M Company (St. Paul, Minn.), Loctite Corporation (Rocky Hill, Conn.), or Dymax Corporation (Torrington, Conn.); primers to promote adhesion to adjacent layers; low adhesion backsize materials for use when the filter is to be used in adhesive roll form; liquid crystal panels; electrochromic or electroluminescent panels; photographic emulsions; prismatic films and holographic films or images. Additional functional layers or coatings are described, for example, in U.S. Pat. Nos. 6,352,761; 6,641,900; 6,830,713; 6,946,188; and 7,150,907 (all Hebrink et al.); U.S. Pat. Nos. 6,368,699 and 6,459,514 (both Gilbert et al.); U.S. Pat. No. 6,737,154 (Jonza et al.); U.S. Pat. No. 6,783,349 (Neavin et al.); and U.S. Pat. No. 6,808,658 (Stover). The functional layers or coatings can also include anti-intrusion, or puncture-tear resistant films and coatings, for example, the functional layers described in U.S. Pat. No. 7,238,401 (Dietz). Additional functional layers or coatings can include vibration-damping film layers such as those described in U.S. Pat. No. 6,132,882 (Landin et al.) and U.S. Pat. No. 5,773,102 (Rehfeld), and barrier layers to provide protection or to alter the transmissive properties of the film towards liquids such as water or organic solvents or towards gases such as oxygen, water vapor or carbon dioxide. Additionally, self-cleaning layers, such as fluorocarbon or fluoropolymer layers known to those skilled in the art can be added. These functional components can be incorporated into one or more of the outermost layers of the optical display filter, or they can be applied as a separate film or coating.

Appropriate chemical treatments of metal layer surfaces and interfaces can help to improve corrosion resistance. Such treatments can be combined with adhesion promoting treatments using similar or different materials, and with plasma treatments, diffusion barriers, and nucleating layers. One or more corrosion inhibiting compounds can be included in the support, the polymers layers, the adhesive, and/or the abrasion-resistant coating. Improved corrosion resistance can be accomplished by exposing a metal surface or interface to a compound such as a mercaptan, a thiol-containing compound, an acid (such as carboxylic acids or organic phosphoric acids), a triazole, a dye, a wetting agent, an organic sulfide, such as PTEA, or a disulfide, ethylene glycol bis-thioglycolate, a benzotriazole or one of its derivatives such as are described in U.S. Pat. No. 6,376,065 (Korba et al.), U.S. Pat. No. 7,148,360 (Flynn et al.), 2-mercaptobenzoxazole, 1-phenyl-1H-tetrazole-5-thiol, and glycol dimercaptoacetate as described in U.S. Pat. No. 4,873,139 (Kinosky), and U.S. Pat. No. 6,357,880 (Epstein et al.).

For some applications, it may be desirable to alter the appearance or performance of the optical display filter, such as by laminating a dyed film layer to the filter, applying a pigmented coating to the surface of the filter, or including a dye or pigment in one or more of the materials used to make the filter. The dye or pigment can absorb in one or more selected regions of the electromagnetic spectrum, including portions of the infrared, ultraviolet or visible spectrum. The dye or pigment can be used to complement the properties of the film, particularly where the film transmits some wavelengths while reflecting others. A particularly useful pigmented layer that can be employed in the films or pre-laminates of the invention is described in U.S. Pat. No. 6,811,867 (McGurran et al.). This layer can be laminated, extrusion coated or coextruded as a skin layer on the film. The pigment loading level can be varied between about 0.01 weight percent (wt %) and about 1.0 wt % to vary the visible light transmission as desired. The addition of a UV absorptive cover layer can also be desirable to protect any inner layers of the film that may be unstable when exposed to UV radiation. The optical display filter can also be treated with, for example, inks or other printed indicia such as those used to display product identification, orientation information, advertisements, warnings, decoration, or other information. Various techniques can be used to print on the filter, such as, for example, screen printing, inkjet printing, thermal transfer printing, letterpress printing, offset printing, flexographic printing, stipple printing, laser printing, and so forth, and various types of ink can be used, including one and two component inks, oxidatively drying and UV-drying inks, dissolved inks, dispersed inks, and 100% solids ink systems.

The provided optical filters can have performance properties that can allow them to simultaneously reflect or transmit various portions of the electromagnetic spectrum. They can be designed to transmit at least 80%, at least 85%, at least 90%, or even at least 92% of the average actinic radiation between the wavelengths of 450 nm and 650 nm. In addition, they can also be designed to reflect less than 10%, less than 8%, less than 5%, or less than 3% of the actinic radiation between the wavelengths of 450 nm and 650 nm. And also in addition, the filters can be designed to block the passage of harmful electromagnetic interference (EMI) emission to or from display devices. The filters can provide EMI shielding of radio frequency waves and microwaves of at least 10 dB, at least 15 dB, at least 20 dB, at least 25 dB, at least 30 dB, at least 35 dB, at least 40 dB, or even at least 45 dB. These ranges are well-known by those skilled in the art and are typically regulated. The filters can also block infrared radiation by reflection of more than 95%, more than 97%, more than 98%, or more than 99% of the average near infrared radiation between 800 nm and 2500 nm.

Optical display filters with low visible reflectance are also especially desirable to improve the display performance. Conceptually, the visible reflectance can be lowered by adding an antireflectance (AR) coating to the outer layers of the multi-layer construction described above. The simplest form of antireflection coating is a single layer, where the refractive index and optical thickness of the AR layer is chosen to match the optical admittance of, for example, the metal layer to the admittance of the incident (neighboring) medium. For the provided optical display filter, the AR function may be provided by the optional basecoat layer and/or the topcoat (the last dielectric layer of the multi-component film, and/or additional layers). The optical filter can also be designed to provide electromagnetic interference (EMI) shielding in the radio frequency and microwave region of the EM spectrum. Generally, electrically conductive films can be used to provide EMI shielding. Shielding Effectiveness (SE) of an electric field is correlated with the film sheet resistance, and in far field can be approximated using the good conductor approximation:

$$SE(dB) = 20 \log (1 + Z_o/2R_s)$$

where $Z_o$ and $R_s$ are the impedance of free space (377Ω) and film sheet resistance, respectively. In many display applications the location of the EMI shield is in the near field for high frequencies. In such cases, the SE achieved is greater than the far field value calculated from the formula above. Therefore, using the far field value of SE is always a conservative approximation. Low reflection optical filters with EMI shielding can be designed using the above design guidelines. However, all the properties such as EMI shielding, transmission, and reflectance are dynamically related. Designing for higher EMI shielding performance requires the filter to have a certain electrical conductivity, which correlates with the overall number and thickness of conductive layers. At the same time, electrically conductive materials such as metals are likely to have high optical loss. As a result, increasing the conductivity by increasing the number and/or thickness of the layers can result in lower transmission. Designing for low reflectance has to take into account all of the layers of the construction rather than just the basecoat and topcoat "AR coatings" as well as all other requirements, such as designing for wide-angle viewing performance. The challenges of designing to meet all attributes such as EMI shielding, high transmission and low reflection over a certain viewing angle are significant. In addition, the results are highly dependent upon the deposition process, since the material properties achieved are very process-dependent. For example, the electrical and optical properties of the conductive layers such as Ag or ITO can be significantly different depending upon process conditions. Controlling these properties is critical to the construction of the interference-type optical filter provided herein.

Good design requires theoretical treatments of the characteristics of electromagnetic wave propagation, which is complicated and usually requires computation methods, which typically involve solving Maxwell's equations with appropriate boundary conditions for an assembly of thin films. The provided optical display filters can be used to modify the radiation emitted from or incident on an electronic display device such as a plasma display panel, a liquid crystal display panel (LDC), organic light emitting diode (OLED) or other devices such as the displays on mobile hand-held phones. Optical display filters, when used on the exterior of the devices, can block harmful radiation being emitted from the devices and improve the visual characteristics including increasing the contrast of the visual display. Alternatively, the provided optical display filters can protect some sensitive electronic devices from radiation external to the device. For example, touch screen devices can be temporarily "densensitized" by exposure to stray electromagnetic radiation (noise) external to the device. Capacitive type touch sensors are particularly sensitive devices. An optical display filter can be located between the touch screen panel and the electronic device to counteract this desensitization.

The provided optical display filters can be used to modify the radiation emitted from an electronic display device such as a plasma display panel, a liquid crystal display panel (LCD), or other devices such as the displays on mobile hand-held phones. Optical display filters, when used external to the devices, can block harmful radiation being emitted from the devices and improve the visual characteristics of the desired visible radiation including increasing the contrast of the visual display. Alternatively, the provided optical display filters can protect some electronic devices from radiation external to the device. For example, touch screen devices can be temporarily "densensitized" by exposure to stray electromagnetic radiation (noise) external to the device. An optical display filter can be located between the touch screen panel and the electronic device to counteract this desensitization.

It is contemplated that the EMI shielding can provide protection to the user of an electronic display device that meets the Specific Absorption Rate (SAR) requirements of governmental agencies. For example, currently the Federal Communications Commission of the United States has set a SAR level of less than 1.6 Watts/kg (W/kg) of radiation between 100 kHz and 10 GHz per 1 g of tissue for mobile phones. The European Union has set a limit of 2 W/kg over 10 g of human tissue. It is contemplated that an electrically-conducting layer can be added to the provided filters to reach these or future limits.

FIG. 1 is an illustration of one embodiment of provided optical filters. Optical filter 100 has substrate 102 that is a film of polyester terephthalate (PET) having a refractive index of 1.65. Nucleation layer 103 has been deposited on the substrate followed by electrically-conductive layer 104. Barrier layer 105, which may be thicker than the nucleation layer and continuous, has been deposited upon the electrically-conductive layer 104. The nucleation layer can be discontinuous and can be thought of as a seed layer for the subsequent deposition of the electrically-conductive layer. The details of the nucleation layer are disclosed, as referenced above, in PCT Appl. No. PCT/US07/089,095 (Stoss et al.). The barrier layer can be discontinuous and similar in thickness to the nucleation layer or can be thicker and continuous. Details of the barrier layer have been discussed above. FIG. 1 includes polymer layer 106 on barrier layer 105. In the embodiment illustrated in FIG. 1 reflectivity between layers of the filters is reduced if the refractive index and thickness are chosen to optically match the electrically-conducting layer 104. Barrier layer 105 is very thin compared to the electrically-conductive layer in this embodiment.

Figure 2:
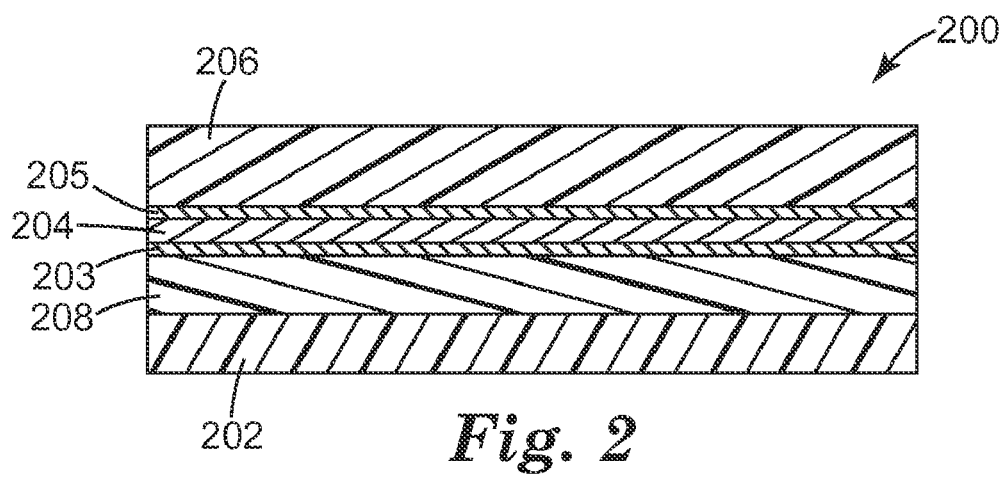

FIG. 2 is another embodiment of provided optical filters in which optical filter 200 includes an additional polymer layer 208 sandwiched between substrate 202 and the multi-layer construction that includes nucleation layer 203, electrically-conductive layer 204, and barrier layer 205. Polymer layer 208 has been added to the embodiment shown in FIG. 2 to optically match the electrically conductive layer as in FIG. 1. If electrically-conductive layer 204 is a metal such as silver, gold, or copper, with a low (<1) real part of the refractive index, then polymer 208 should have a high index optically match electrically-conductive layer 204 (neglecting the optical contribution of the very thin barrier layer 205) and to raise the effective refractive index of layer 204 to more closely match substrate 202. The ideal polymer layer 208 has a refractive index as high or higher than polymer layer 206, which is also present in this embodiment. In another embodiment, also illustrated by FIG. 2, seed layer 203 can be made thicker so as to form a matching optical pair with polymer 208. In this embodiment the matching pair 203/208 preferably has an effective index of refraction greater than that of substrate 202.

Figure 3:
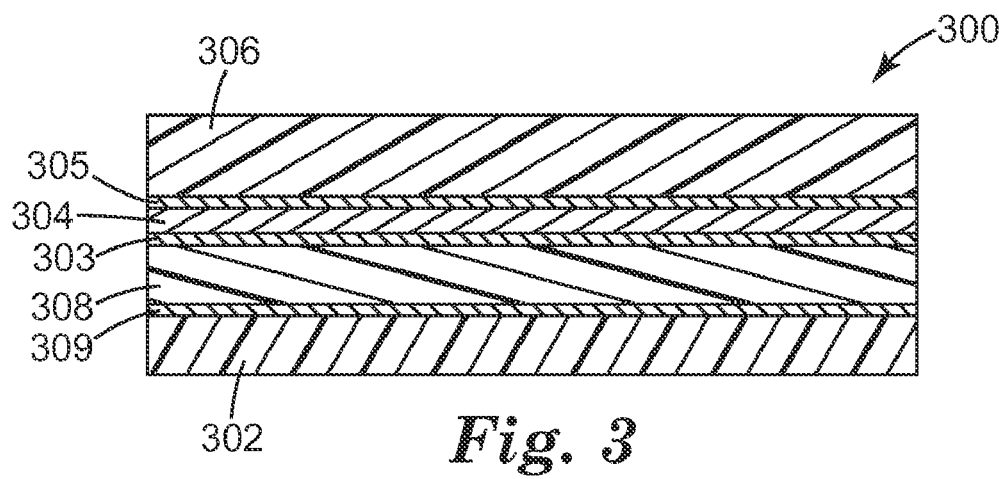

FIG. 3 is an illustration of another embodiment 300 of provided optical filters and differs from the embodiments illustrated in FIG. 2 in that there is an additional nucleation-barrier layer 309 between the substrate 302 and the polymer layer 308. In one such embodiment, substrate 302 has layers 309, 308, and 303 that act as a symmetrical three-layer equivalent index optical layer disposed upon the substrate. In an exemplary embodiment, layers 303 and 309 are continuous ZnO layers and layer 308 is a high index acrylic polymer. For a low index metal electrically-conducting layer 304, the symmetrical three-layer equivalent index optical layer preferably has an equivalent index greater than that of PET. Electrically-conductive layer 304 and barrier layer 305 are disposed on top of the symmetrical three-layer equivalent optical layer and polymer 306 is atop the barrier layer to provide extra optical effects and environmental protection.

Figure 4:
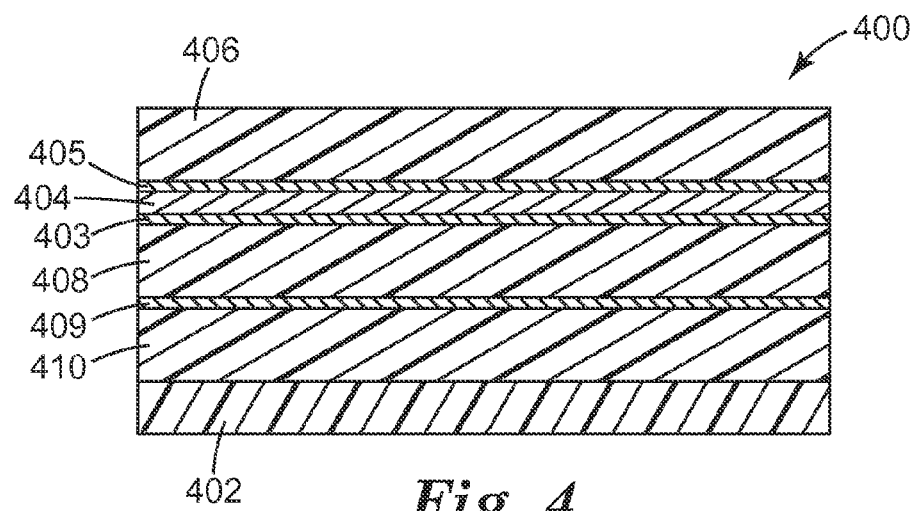

FIG. 4 illustrates an embodiment 400 of provided optical filters in which four layers, polymer 410, metal oxide layer 409, polymer 408, and seed layer 403 perform optical matching between substrate 402 and electrically-conducting layer 404. As in most other embodiments, electrically conducting layer 404 is protected by barrier layer 405 and polymer 406. In an additional embodiment of the provided optical filters that can also be illustrated by FIG. 4, polymer 410 which is in contact with substrate 402, can be deposited at a half wave optical thickness and the elements 409, 408, and 403 can form a three-layer optical layer that has an equivalent index of refraction that is preferably higher than that of substrate 402.

Figure 5:
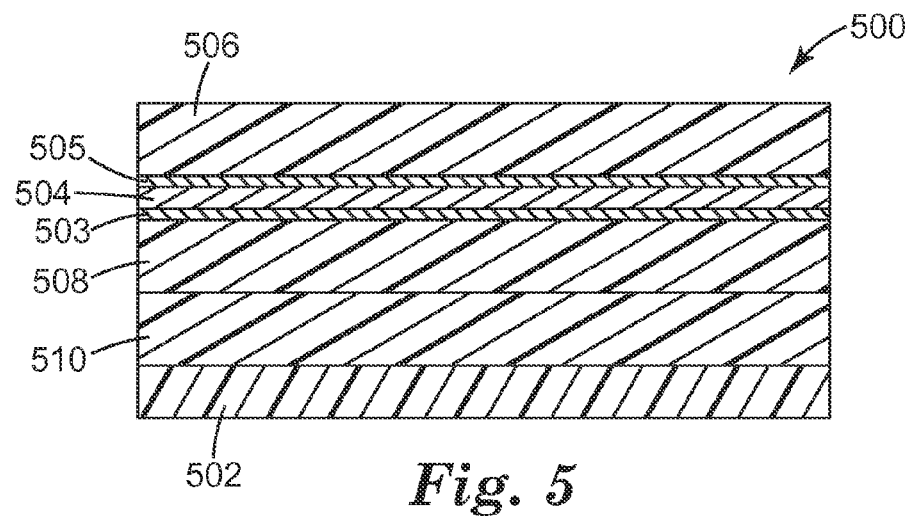

FIG. 5 illustrates an embodiment 500 in which two polymers—508 with a high index of refraction and 510 with a low index of refraction are disposed on substrate 502. In this embodiment seed layer 503 allows for the deposition of electrically-conductive layer 504 that is protected by barrier layer 505 and then polymer layer 506 as in previous embodiments. Low index polymer 510 has a thickness of about a quarter wave optical thickness and high index polymer 508 and seed layer 503 function as a two layer equivalent optical matching layer.

Figure 6:
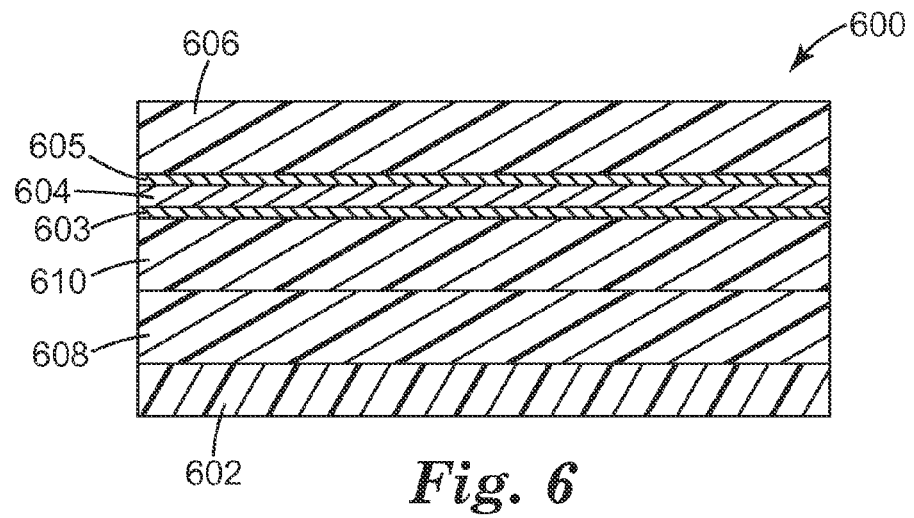

FIG. 6 illustrates an embodiment 600 schematically very similar to that of FIG. 5 except that electrically-conductive layer 604 has a high refractive index. Polymer 608, which is adjacent and in contact with substrate 602, has a refractive index different from the refractive index of polymer 610. The combination of these two polymer layers function as a two-layer equivalent optical matching layer. Seed layer 603, electrically-conductive layer 604 are deposited on top of polymer 610 and then barrier layer 605 and polymer layer 606 finishes the filter construction.

Figure 7A:
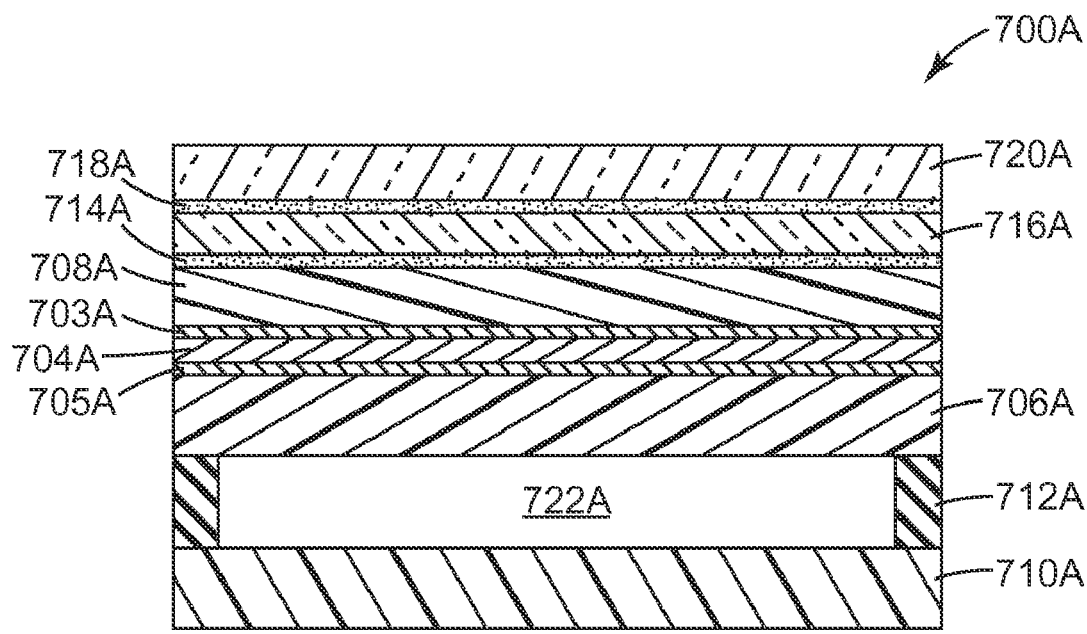
FIGS. 7A and 7B are illustrations of embodiments of provided optical display filters mounted on liquid crystal display panels that have touch sensitivity.

FIG. 7A illustrates an embodiment 700A of a touch-sensitive electronic device that includes a provided optical filter. The device includes LCD display 710A. A multi-layer stack is disposed on the LCD display face using rubber gaskets 712A that provide air space 722A over most of the LCD display face. The filter includes substrate 706A upon which is disposed a multi-layer construction that includes seed (nucleation) layer 705A, electrically-conducting layer 704A, barrier layer 703A, and polymer layer 708A. On top of the multi-layer construction is touch-sensitive glass 716 that is bonded to the top polymer layer 708A of the multi-layer construction with optically clear adhesive 714A. Finally glass 720A is bonded to touch glass 716A with an additional layer of optically clear adhesive 714A.

Figure 7B:
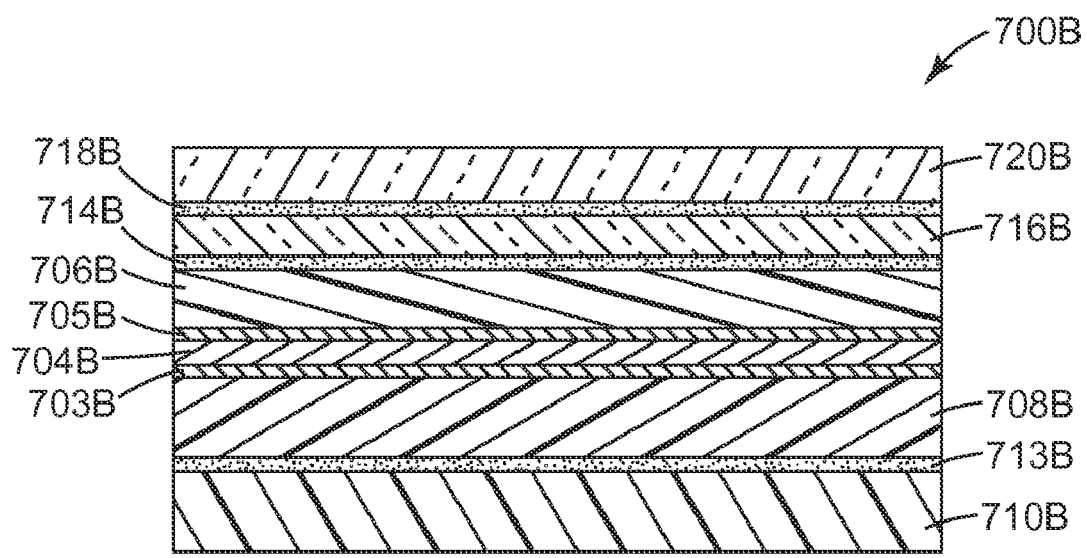

FIG. 7B illustrates another embodiment 700B of a touch-sensitive electronic device that includes a provided optical filter. The device includes LCD display 710B. A multi-layer filter is disposed directly upon the LCD display face using optically clear adhesive 713B. The filter comprises a multi-layer construction that includes polymer layer 708B, barrier layer 703B, electrically-conducting layer 704B, and seed (nucleation) layer 705B. The arrangement of the multi-layer construction in embodiment 700B is reversed from that in embodiment 700A. The illustrated embodiment in 700B enables capacitive coupling for capacitive touch screen displays. It is to be understood that either configuration of the multi-layer construction can be used in either embodiments 700A or 700B. On top of the multi-layer construction is touch-sensitive glass 716B that is bonded to the top polymer layer 708B of the multi-layer construction with optically clear adhesive 714B. Finally glass 720B is bonded to touch glass 716B with an additional layer of optically clear adhesive 718B.

Figure 8:
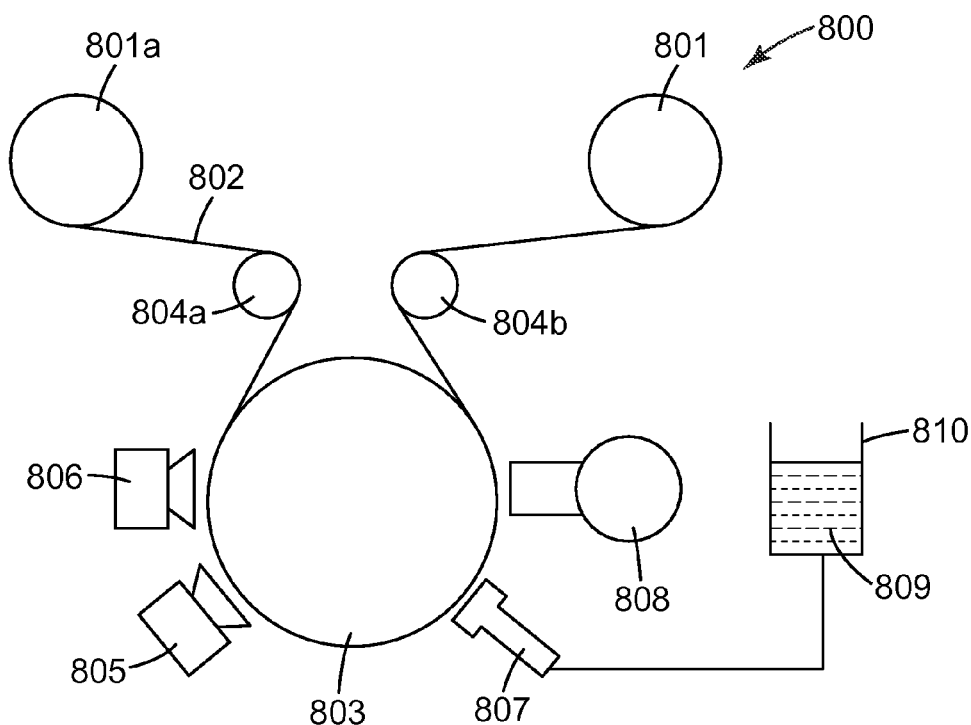
FIG. 8 is a schematic of a process line that can be used to produce some embodiments of the provided optical filters.

An apparatus 800 that can conveniently be used to manufacture films of the present invention is illustrated by the schematic in FIG. 8. Powered reels 801 and 801a move supporting web 802 back and forth through apparatus 800. Temperature-controlled rotating drum 803 and idlers 804a and 804b carry web 802 past metal/metal oxide sputter applicator 805, plasma treater 806, monomer evaporator 807 and UV light station (curing station) 808. Liquid monomer 809 is supplied to evaporator 807 from reservoir 810. Successive layers can be applied to web 802 using multiple passes through apparatus 800. Apparatus 800 can be enclosed in a suitable chamber (not shown in FIG. 8) and maintained under vacuum or supplied with a suitable inert atmosphere in order to discourage oxygen, water vapor, dust and other atmospheric contaminates from interfering with the various plasma, monomer coating, curing and sputtering steps. Vacuum is required for the sputtering step—the other processes can preferably be run in vacuum but could be run at other pressures.

The provided optical display filters are useful in combination with electronic displays such as liquid crystal displays, OLED displays, or plasma displays that can be used on electronic devices such as hand-held mobile phones. The filters can modify the radiation that is emitted from these devices so as to block the transmission of unwanted or harmful wavelengths and modify the selection of wavelengths allowed to be transmitted. For example, in some embodiments the filters can block the transmission of EMI radiation and can be designed to allow visible radiation to be transmitted but not infrared.

In some embodiments the provided display filter can be integrated into touch-sensitive devices as depicted, for example, in FIGS. 7A and 7B. Touch-sensitive devices can be resistive or capacitive. The provided display filters are particularly useful when a capacitive touch-sensitive substrate is used to provide touch sensitivity since the filters protect the glass from unwanted radiation generated by the device which can also erroneously interact with the touch-sensitive layer.

Objects and advantages of this invention are further illustrated by the following examples, but the particular materials and amounts thereof recited in these examples, as well as other conditions and details, should not be construed to unduly limit this invention.

EXAMPLES

TABLE 1

Materials for Examples

| Identification | Description |
| --- | --- |
| EBECRYL 130 | An acrylate available as "EBECRYL130" from Cytec Surface Specialties, West Paterson, N.J. |
| SR335 | Lauryl acrylate available as "SR335" from Sartomer Company, Inc., Exton, Pennsylvania. |

TABLE 1-continued

Materials for Examples

| Identification | Description |
| --- | --- |
| CN147 | An acidic acrylate oligomer available as "CN147" from Sartomer Company, Inc. |
| Dar1173 | A photoinitiator available as "Darocur ™ 1173" from Ciba Specialty Chemicals Corporation, Tarrytown, New York. |
| HBPA | Biphenyl-2-yl acrylic acid ester, prepared internally. Also available as orthophenylphenol acrylate as "ARONIX TO-2344" from Toagosei Co., Ltd., Tokyo, Japan. |
| CN120C60 | A difunctional bisphenol A based epoxy acrylate blended with trimethylolpropane triacrylate available as "CN120C60" from Sartomer Company, Inc. |
| PTEA | Phenylthioethyl acrylate available as "PTEA" from Bimax Chemicals Ltd., Cockeysville, Maryland. |
| Formulation 1 | An acrylate monomer solution having 67 parts (by wt.) EBECRYL 130, 23 parts SR335, 6 parts CN147 and 4 parts Dar1173 |
| Formulation 2 | An acrylate monomer solution having 81 parts (by wt.) HBPA, 9 parts CN120C60, 6 parts PTEA and 4 parts Dar1173 |
| Formulation 3 | An acrylate monomer solution having 59 parts (by wt.) HBPA, 29 parts CN120C60, 8 parts PTEA and 4 parts Dar1173 |

Example 1

Example 1 is of an embodiment illustrated by FIG. 2. The layer reference numbers refer to the corresponding layers in FIG. 2. Each layer is successively deposited upon the previous layer, unless otherwise indicated.

Layer (208)—A polyester (PET) web with a thickness of 0.051 mm and a width of 432 mm available as "SH34" from SKC, Inc., Covington, Ga., was loaded into a roll to roll vacuum chamber. The pressure in the vacuum chamber was reduced to $3\times10^{-5}$ torr (0.004 Pa). Nitrogen gas was introduced into the vacuum chamber and regulated to 0.300 torr (40 Pa). The polyester web was sequentially plasma treated at 600 watts and a frequency of 400 kHz, acrylate coated and cured during one pass through the vacuum chamber at a web speed of about 15 m/min. Formulation 1 was the acrylate monomer solution used to produce the acrylate coating. Prior to coating, about 20 ml of Formulation 1 was degassed in a vacuum bell jar for about 25 minutes. The monomer solution was loaded into a syringe. A syringe pump was used to pump the solution through an ultrasonic atomizer. After atomization, the solution was flash evaporated at a temperature of about 275° C., followed by condensing of the solution vapor onto the PET web. Condensation was facilitated by contacting the uncoated PET web surface to the circumference of a drum maintained at a temperature of −15° C. The condensed solution was cured using low-pressure-mercury-arc (germicidal) UV bulbs.

Layer (203)—The vacuum chamber pressure was reduced to $3\times10^{-5}$ torr. Argon gas at a flow rate of 60 standard cubic centimeters per minute (sccm) was introduced into the vacuum chamber through the ZnO source, producing a pressure of 0.0016 torr (0.21 Pa). The web direction was reversed and ZnO was sputter coated onto the acrylate coating at a web speed of 9.1 m/min. The ZnO was sputtered at 2,000 watts power (498 volts and 4.01 amps) and a drum temperature of about 16° C.

Layer (204)—The vacuum chamber pressure was reduced to $3\times10^{-5}$ torr (0.004 Pa). Argon gas at a flow rate of 60 sccm was introduced into the vacuum chamber through the Ag source, producing a pressure of 0.0016 torr (0.21 Pa). The web direction was reversed and Ag was sputter coated onto the ZnO surface of the web at a web speed of 15 m/min. The Ag was sputtered at 2,700 watts power (590 volts and 16.96 amps) and a drum temperature of about 16° C.

Layer (205)—The vacuum chamber pressure was reduced to $3\times10^{-5}$ torr (0.004 Pa). Argon gas at a flow rate of 60 sccm was introduced into the vacuum chamber through the ZnO source, producing a pressure of 0.0016 torr (0.21 Pa). The web direction was reversed and ZnO was sputter coated onto the Ag surface at a web speed of 9.1 m/min. The ZnO was sputtered at 2,000 watts power (498 volts and 4.01 amps) and a drum temperature of about 16° C.

Layer (206)—The pressure in the vacuum chamber was reduced to $3\times10^{-5}$ torr (0.004 Pa). Nitrogen gas was introduced into the vacuum chamber and regulated to 0.300 torr (40 Pa). The web direction was reversed. The ZnO surface was sequentially plasma treated, following the previously described plasma procedure, acrylate coated and cured during one pass at a web speed of about 15 m/min. Formulation 1 was the monomer solution used to produce the acrylate coating. Prior to coating, about 20 ml of Formulation 1 was degassed in a vacuum bell jar for about 25 minutes. The monomer solution was loaded into a syringe. A syringe pump was used to pump the solution through an ultrasonic atomizer. After atomization, the solution was flash evaporated at a temperature of about 275° C., followed by condensing of the solution vapor onto the PET web. Condensation was facilitated by contacting the uncoated PET web surface to the circumference of a drum maintained at a temperature of –15° C. The condensed solution was cured using low-pressure-mercury-arc (germicidal) UV bulbs.

Example 2

Example 2 was using a procedure identical to that of Example 1 except that the polyester (PET) web had a thickness of 0.18 mm and a width of 457 mm available as "ST505" from Dupont Teijin Films Ltd., Hopewell, Va., Formulation 2 was used in place of Formulation 1, for the first acrylate coating the web speed was 13 m/min, for the second acrylate coating the web speed was 12.5 m/min and the silver sputtering was conducted at 2,400 watts (590 volts and 16.96 amps) at a web speed of 18 m/minute.

Example 3

Example 3 was prepared using a procedure identical to that of Example 2 except, Formulation 3 was used in place of Formulation 2 and the line speed during the silver sputtering was 15 m/min.

Comparative Example A

Comparative Example A was prepared using a procedure identical to that of Example 1, except the second ZnO layer was not utilized and the final acrylate coating was coated directly onto the Ag surface following the procedure of Example 1.

Optical Analysis Test Method

Measurements were made on a BYK Gardner TCS PLUS Spectrophotometer Model 8870 (BYK Gardner Inc., USA). The percent transmittance was measured from 380 to 720 nm in 10 nm increments. Reflectance was measured similarly with specular reflection included. Color data for reflection was reported in CIELAB space and for transmission in Yxy color scale, both with D65 illuminant and 10 degree observer.

Electrical Analysis Test Method

The surface resistance was measured by Eddy current method using Model 717B Benchtop Conductance Monitor, available from Delcom Instruments Inc., Prescott, Wis.

Reliability Analysis Test Method

Film samples, approximately 3.2 cm×3.6 cm, of Examples 1-3 and Comparative Example A were placed in controlled temperature and humidity chambers. Samples of Example 1 and Comparative Example A were placed in a chamber set at 60° C. and 85% humidity for 180 hrs. Samples of Examples 2 and 3 were placed in a chamber set at 85° C. and 85% humidity for 65 hrs. A salt spray test (ASTM B117) having a salt spray chamber was also used (salt solution 5 g/95 mL deionized water, temperature 35° C., air pressure to fog nozzle: 5-8 psi (34.5-55.1 kPa), fog collection 80 square cm funnel/100 mL graduate 1-2 mL/h, pH 6.5-7.2). Samples of Example 1 and Comparative Example A were held in the salt spray chamber for 19 hrs. After exposing to such conditions, samples were visually inspected. If the appearances of a significant number of visually observable optical defects existed (greater than 3 per 10 cm$^2$ of film sample), the sample was considered to have failed the test. If 3 or fewer optical defects per 10 cm$^2$ of film sample were observed, the sample was considered to have passed the test.

Prior to conducting the reliability tests, film samples of Example 1 and Comparative Example A were subjected to an additional cure of ~70 mJ/cm$^2$ of UVC radiation generated using an UV H bulb while film samples of Examples 2 and 3 were subjected to an additional cure of ~350 mJ/cm$^2$ of UVC radiation generated using the same bulb.

TABLE 2

| | Test Results | | | |
|---|---|---|---|---|
| Test Parameter | Example 1 | Example 2 | Example 3 | Comparative Example A |
| Color Y (transmission) | 84.91 | 89.07 | 88.28 | 86.32 |
| Color x (transmission) | 0.3157 | 0.3131 | 0.3138 | 0.3157 |
| Color y (transmission) | 0.3347 | 0.3327 | 0.3329 | 0.3347 |
| Average transmission (450-650 nm) | 84.6 | 88.8 | 88.0 | 86.0 |
| Color L* (Reflectance) | 37.45 | 31.95 | 31.88 | 35.06 |
| Color a* (Reflectance) | 1.36 | 5.01 | 4.20 | 3.24 |
| Color b* (Reflectance) | −7.65 | −1.02 | −4.83 | −7.82 |
| Average Reflectance (450-650 nm) | 10.1 | 7.4 | 7.4 | 8.9 |
| Sheet Resistance (ohms/square) | 12.2 | 20.3 | 16.3 | 16.5 |
| Reliability (60° C./85% humidity/180 h) | Passed | — | — | Failed |
| Reliability (85° C./85% humidity/65 h) | — | Passed | Passed | — |
| Reliability (Salt Spray) | Passed | — | — | Failed |

EMI Analysis Test Method
Equipment Used for Test:
  Semi anechoic chamber & shielded control room
  2 1-18 GHz double rigged horn antennas
  Rohde & Schwarz ESIB 40 receiver, available from Rohde & Schwarz, Irving, Tex.
  Rohde & Schwarz EMC 32 software Agilent E8257D signal generator, available from Agilent, Santa Clara, Calif.

Computer with IEEE 488 card (used to control the signal generator and receiver)

The test was a modified IEEE 299 test procedure, which was for testing the shielding effectiveness of enclosures. The enclosure was the chamber which, when sealed, had over 100 dB of attenuation. The bulkhead panel between the chamber and the control room used for routing coax cables was replaced with a steel panel that had a 9.5 cm by 9.5 cm aperture in the center. The test measured the amount of signal leakage caused by the opening in the panel both with and without the shielding material sample covering the aperture opening. One of the horn antennas was placed in the chamber and centered one foot in front of the aperture. This was the transmit side of the test. The antenna was connected to the signal generator with a short piece of high frequency coax cable. The signal generator was connected to the computer via an IEEE 488 cable. On the receive side, which was in the control room on the opposite side of the aperture plate, the second horn antenna was placed one foot in front, and centered on the aperture. This antenna was connected to the ESIB 40 receiver through a high frequency coax. The receiver was also connected to the computer via the IEEE 488 bus.

Using the EMC 32 software, the signal generator output was set at +10 dBm and was swept in 10% steps from 1 to 18 GHz. The receiver was setup with a resolution bandwidth of 120 kHz, an average detector, and a measurement time of 0.5 sec. During the test, the software held each transmit frequency for 0.5 sec while the receiver took a measurement of the received signal and stored the frequency and signal level in a table. The computer then stepped the transmit frequency up by 10% and the process was repeated.

At the beginning of the test, a measurement was taken antenna to antenna with no shielding material in the path. This was a measure of the maximum signal that was radiated through the aperture opening. This was the Reference Level used in calculating the shielding effectiveness of the material. The test sample was cut to a size of 12.7 cm$^2$×12.7 cm$^2$ and was attached to the aperture plate, completely covering the opening. Copper tape with a conductive adhesive was used to attach the sample material to the plate. The tape was applied to all four sides of the sample. The tape did not extend into the area of the aperture opening, but rather sealed the edges of the sample to the plate.

Figure 9:
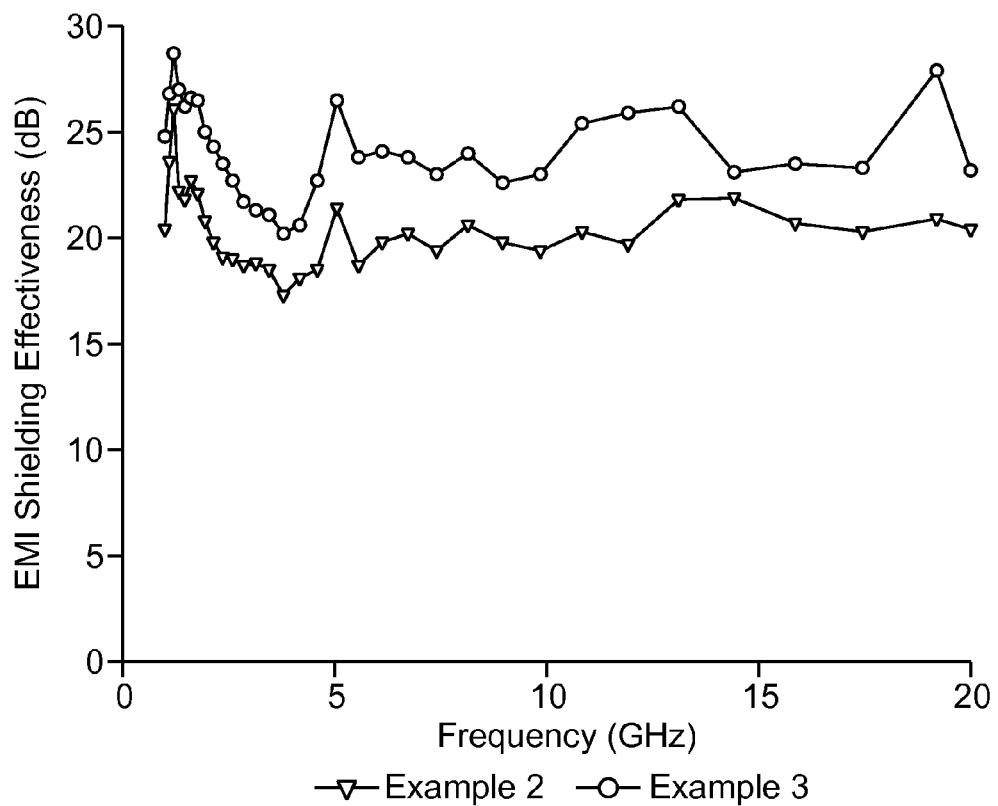
FIG. 9 is a graph of the EMI shielding vs. frequency for two provided embodiments.

The sweep was repeated measuring the amount of signal radiating through the sample from 1 to 18 GHz. The software stored these measurements along with the difference between the reference level and the sample level. The result was the shielding effectiveness of the material express in dB. Both levels are stored in a table for later plotting of the shielding versus frequency. The process was then repeated for each of the remaining samples to be measured. The test data for Example 2 and Example 3 are displayed in FIG. 9.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references in this application are hereby incorporated herein by reference in their entirety.

What is claimed is:

1. An optical display filter comprising:
a transparent polymeric substrate;
a multi-layer construction adjacent to the substrate, the construction consisting essentially of;
an electrically-conductive layer having a first surface and a second surface;
a discontinuous nucleation layer in contact with the first surface; and
a barrier layer in contact with the second surface, and
a transparent dielectric layer adjacent to the construction; and
a basecoat polymer layer between the substrate and the multi-layer construction, wherein the transparent dielectric layer comprises an organic polymer having a refractive index greater than about 1.49.

2. The filter according to claim 1 wherein the nucleation layer comprises zinc oxide or bismuth oxide.

3. The filter according to claim 1 wherein the electrically-conductive layer comprises silver, copper, rhodium, ruthenium, chromium, aluminum, gold, palladium, platinum, nickel, or zinc.

4. The filter according to claim 1 wherein the barrier layer comprises ZnO, ZnSnO$_3$, Zn$_2$SnO$_4$, In$_2$O$_3$, SnO$_2$, or indium-tin-oxide.

5. The filter according to claim 1 further comprising at least one of an antireflection layer, a low friction coating layer, a polarizer, an antistatic layer, an abrasion resistant layer, an anti-fogging material layer, a magnetic or magneto-optic layer, an adhesion promoter, an anti-intrusion layer, a vibration-damping layer, a self-cleaning layer, a color-compensation layer, and an anti-corrosion layer.

6. The filter according to claim 1 further comprising an optically clear adhesive.

7. The filter according to claim 1 wherein the filter has an average optical transmission of greater than 85% between the wavelengths of 450 nm and 650 nm.

8. The filter according to claim 1 wherein the filter has a sheet resistance of less than 300 ohms/square.

9. The filter according to claim 1 wherein the filter provides EMI shielding of less than 30 dB when the frequency is in the range of from 1 GHz to 18 GHz.

10. The filter according to claim 1 further comprising a dye or pigment that can absorb in one or more regions of the electromagnetic spectrum.

11. A display panel comprising at least one optical filter according to claim 1.

12. The display panel according to claim 11 wherein the panel is electronically responsive to touch.

13. The display panel according to claim 12 comprising a capacitive touch-sensitive substrate.

14. A device comprising a display panel according to claim 11.

15. A device comprising a display panel according to claim 12.

16. The filter according to claim 1, wherein the organic polymer is formed from organic monomers that comprise biphenyl-2-yl acrylic acid ester with volatilizable acrylamides, volatilizable (meth)acrylates, or combinations thereof.

17. The filter according to claim 1, wherein the filter has a sheet resistance of less than 100 ohms/square.

* * * * *